(12) United States Patent
Thelen et al.

(10) Patent No.: US 12,028,748 B2
(45) Date of Patent: Jul. 2, 2024

(54) OPTIMIZED HANDLING OF HIGH PRIORITY DATA SECTIONS IN A COMMUNICATION SYSTEM

(71) Applicant: QUALCOMM Incorporated, San Diego, CA (US)

(72) Inventors: Christian Oliver Thelen, San Diego, CA (US); Senthilkumar Sundaram, San Diego, CA (US); Rohan Salvi, San Diego, CA (US); James Krysl, San Diego, CA (US); Kenneth David Easton, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/481,244

(22) Filed: Sep. 21, 2021

(65) Prior Publication Data

US 2022/0095160 A1   Mar. 24, 2022

Related U.S. Application Data

(60) Provisional application No. 63/082,446, filed on Sep. 23, 2020.

(51) Int. Cl.
*H04W 28/06* (2009.01)
*H04L 27/26* (2006.01)
*H04B 7/06* (2006.01)

(52) U.S. Cl.
CPC ......... *H04W 28/06* (2013.01); *H04L 27/2655* (2013.01); *H04B 7/0617* (2013.01)

(58) Field of Classification Search
CPC .................................................... H04W 28/06
See application file for complete search history.

(56) References Cited

U.S. PATENT DOCUMENTS

2019/0254047 A1\* 8/2019 Ahmed ............. H04W 28/0231
2020/0383105 A1\* 12/2020 Park ....................... H04L 1/1896
(Continued)

FOREIGN PATENT DOCUMENTS

| WO | 2018228557 A1 | 12/2018 | |
| WO | 2020030029 A1 | 2/2020 | |
| WO | WO-2022059871 A1 \* | 3/2022 | ........... H04B 7/0413 |

OTHER PUBLICATIONS

International Search Report and Written Opinion—PCT/US2021/051505—ISA/EPO—dated Jan. 5, 2022.
(Continued)

*Primary Examiner* — Jackie Zuniga Abad
(74) *Attorney, Agent, or Firm* — Loza & Loza, LLP

(57) ABSTRACT

Aspects relate to provision of a control message, such as an extension data section, that includes an indication of the repeat of highest priority data sections. The control message may be generated in a distributed unit (DU) and conveyed to a radio unit (RU) via a fronthaul link. The control message may include either a flag or bits in a field of an extension data section allowing a RU to determine repeat of the highest priority data section based on reception of the flag or processing of the bit value in the field. Additionally, the indication of repetition of the highest priority section may be based on a section identifier transmitted by a DU, wherein an RU receiving the section identifier may determine repeat of the highest priority data section by tracking the received section identifier.

23 Claims, 16 Drawing Sheets

(56) References Cited

U.S. PATENT DOCUMENTS

| | | | |
|---|---|---|---|
| 2021/0136788 A1* | 5/2021 | Lim | H04W 72/20 |
| 2021/0329655 A1* | 10/2021 | Liu | H04L 1/0081 |
| 2022/0078631 A1* | 3/2022 | Salahuddeen | H04W 28/0815 |
| 2023/0171778 A1* | 6/2023 | Kittichokechai | H04L 1/1671 370/329 |

OTHER PUBLICATIONS

O-Ran Fronthaul Working Group: "Control, User and Synchronization Plane Specification", Technical Specification—O-RAN.WG4.CUS. 0-V03.00—O-Ran Fronthaul Working Group: Control, User and Synchronization Plane Specification, O-RAN, vol. O-RAN.WG4.CUS. 0-v03.00, Apr. 1, 2020 (Apr. 1, 2020), pp. 1-253, XP009530675 , Retrieved from the Internet: URL: https://www.o-ran.org/specifications, p. 25-p. 26 p. 53 p. 100.

* cited by examiner

Message #1:

| # | priority | symbolMask | startPrbc | numPrbc | reMask | beamId | Note |
|---|---|---|---|---|---|---|---|
| 1 | +1 | 1001000 | 0 | 12 | 001000 | 1 | Reference signal |
| 2 | +1 | 1001000 | 0 | 12 | 000001 | 2 | Reference signal |
| 3 | 0 | 1111110 | 0 | 4 | 111111 | 100 | UE1 |
| 4 | 0 | 1111110 | 4 | 4 | 111111 | 200 | UE2 |

Message #2:

| # | priority | symbolMask | startPrbc | numPrbc | reMask | beamId | Note |
|---|---|---|---|---|---|---|---|
| 1 | +1 | 1001000 | 0 | 12 | 001000 | 1 | Reference signal |
| 2 | +1 | 1001000 | 0 | 12 | 000001 | 2 | Reference signal |
| 3 | 0 | 1111110 | 8 | 4 | 111111 | 300 | UE3 |

FIG. 9

OPTIMIZED HANDLING OF HIGH PRIORITY DATA SECTIONS IN A COMMUNICATION SYSTEM

CROSS REFERENCE TO RELATED APPLICATIONS

This application claims priority to and the benefit of U.S. Provisional Application No. 63/082,446 filed in the U.S. Patent and Trademark Office on Sep. 23, 2020, the entire contents of which are incorporated herein by reference as if fully set forth below in its entirety and for all applicable purposes.

TECHNICAL FIELD

The technology discussed below relates generally to wireless communication networks, and more particularly to optimized handling or indication of high priority data sections in a communication system.

INTRODUCTION

Next-generation wireless communication systems (e.g., 5G systems) may include a 5G core network and a 5G radio access network (RAN), such as an open-radio access network (O-RAN) as specified by the O-RAN Alliance. A typical RAN supports wireless communication with mobile devices (e.g., user equipment (UE)) via one or more cells and, more particularly, via remote radio units (RRUs)/remote radio heads (RRHs). In an O-RAN, however, the RRUs/RRHs are connected to baseband units (BBU) through a physical link called the fronthaul, which may include further elements such as a distributed unit (DU).

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

The disclosure relates in some aspects to providing an indication of the repeat of highest priority data sections in a RAN such as an O-RAN. For example, a control plane message between a distributed unit (DU) and a radio unit (RU) of an RAN (e.g., an O-RAN) may include an indication that high priority data sections that may be repeated over a fronthaul link.

In some examples, a method of communication at a network node such as a DU is disclosed. The method includes generating a control message where the control message includes at least one field that indicates when transmission of a prioritized data section is being repeated. Additionally, the method includes transmitting the control message to a radio unit (RU) over a fronthaul link.

In other examples, a network node such as a DU is disclosed including a transceiver, a memory, and a processor communicatively coupled to the transceiver and the memory. The processor and the memory are configured to generate a control message, where the control message includes at least one field that indicates when transmission of a prioritized data section is being repeated. Further, the process and memory are configured to transmit the control message to a radio unit (RU) over a fronthaul link with the transceiver.

In still other examples, a method of communication at a radio unit (RU) is disclosed. The method includes receiving a control message from a network node over a fronthaul link, wherein the control message comprises at least one field that indicates when transmission of a prioritized data section is being repeated. Furthermore, the method includes processing the control message including the prioritized data section that is repeated based on the indication of the at least one field.

In yet other examples, a network device such as a radio unit (RU) is disclosed including a transceiver, a memory, and a processor communicatively coupled to the transceiver and the memory. The processor and the memory are configured to receive a control message from a network node over a fronthaul link, wherein the control message includes at least one field that indicates when transmission of a prioritized data section is being repeated. Further, the processor and the memory are configured to process the control message including the prioritized data that is repeated based on the indication of the at least one field.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

BRIEF DESCRIPTION OF THE DRAWINGS

FIG. 9 is a diagram illustrating message formats for transmissions of multiple messages according to some aspects.

DETAILED DESCRIPTION

Figure 1:
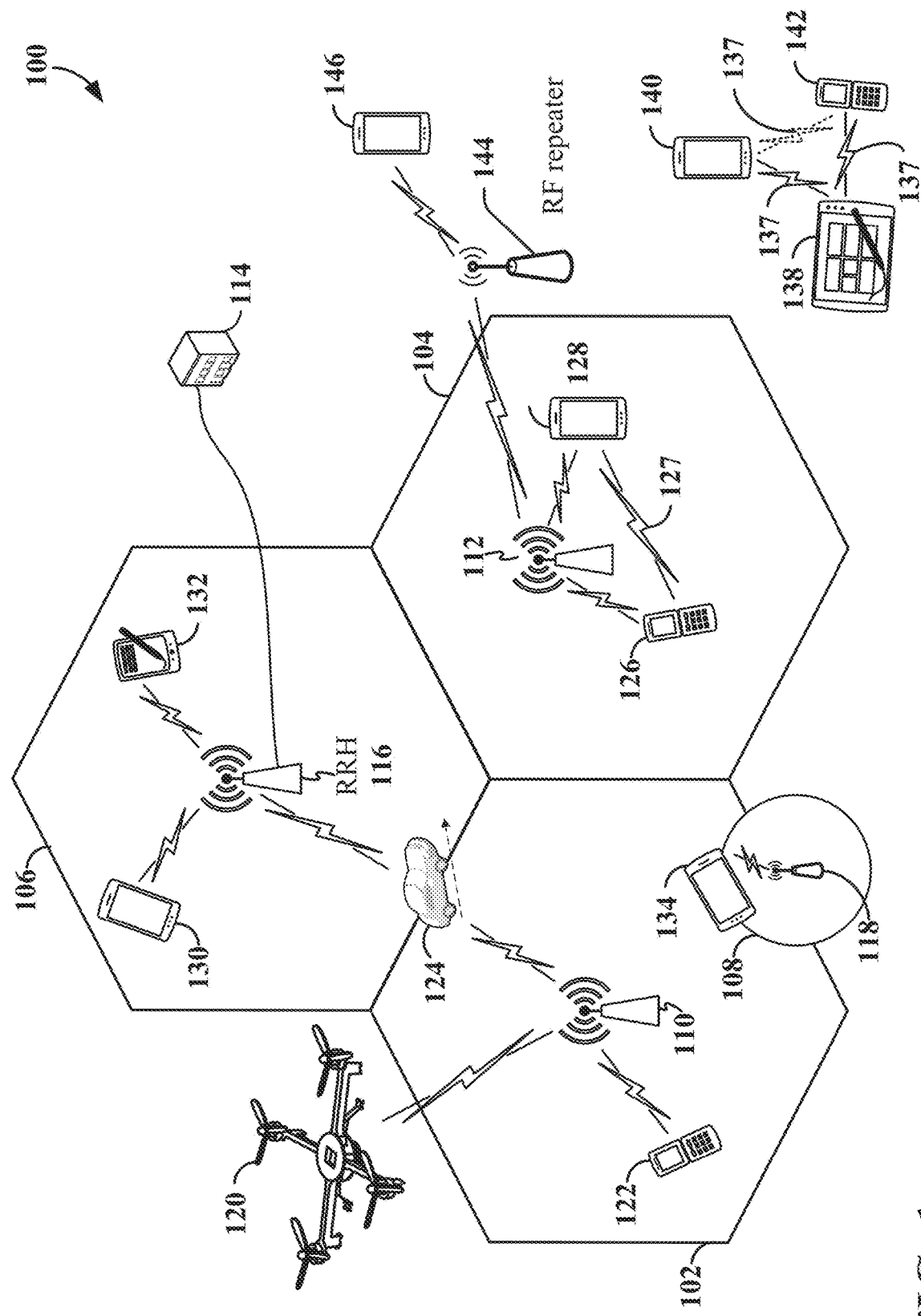
FIG. 1 is a conceptual illustration of an example of a radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Various aspects of the disclosure relate to providing an indication of the repeat of highest priority data sections in a RAN such as an O-RAN, such as specified by the O-RAN Alliance. In an aspect, a control plane message (i.e., C-plane message) between a distributed unit (DU) and a radio unit (RU) of an RAN (e.g., an O-RAN) may include an indication that high priority data sections may be repeated over a fronthaul link. It is noted that control messages repeated across multiple messages ensures that the highest priority section description, which is repeated across messages, is interpreted correctly. The repeated messages may cause RU to apply beamforming weights multiple times for resource elements (REs) in the highest priority sections, where the RU keeps track of weights that have been processed for every RE. This tracking requires a RU to maintain state information on a per RE basis across all layers and symbols, which is expensive in terms of memory and hardware size, as well as latency. Accordingly, the presently described provision of an indication when a highest priority section is being repeated may mitigate the cost and latency according to at least some aspects.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network (RAN) 100 is provided. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eU-TRAN) standards, often referred to as LTE. The 3GPP refers to this hybrid RAN as a next-generation RAN, or NG-RAN. Furthermore, the RAN 100 may be configured as an O-RAN in some aspects. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smart-book, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading. Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In some further examples, the RAN 100 may include an RF repeater 144 in communication with a base station or gNB such as base station 112. The RF repeater 144 is configured to repeat UL and DL transmissions between the base station 112 and one or more UEs, such as UE 146 as an example. Furthermore, as will be discussed later, the RF repeater 144 may be configured to utilize beam forming for transmission to a UE such as UE 146.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 2:
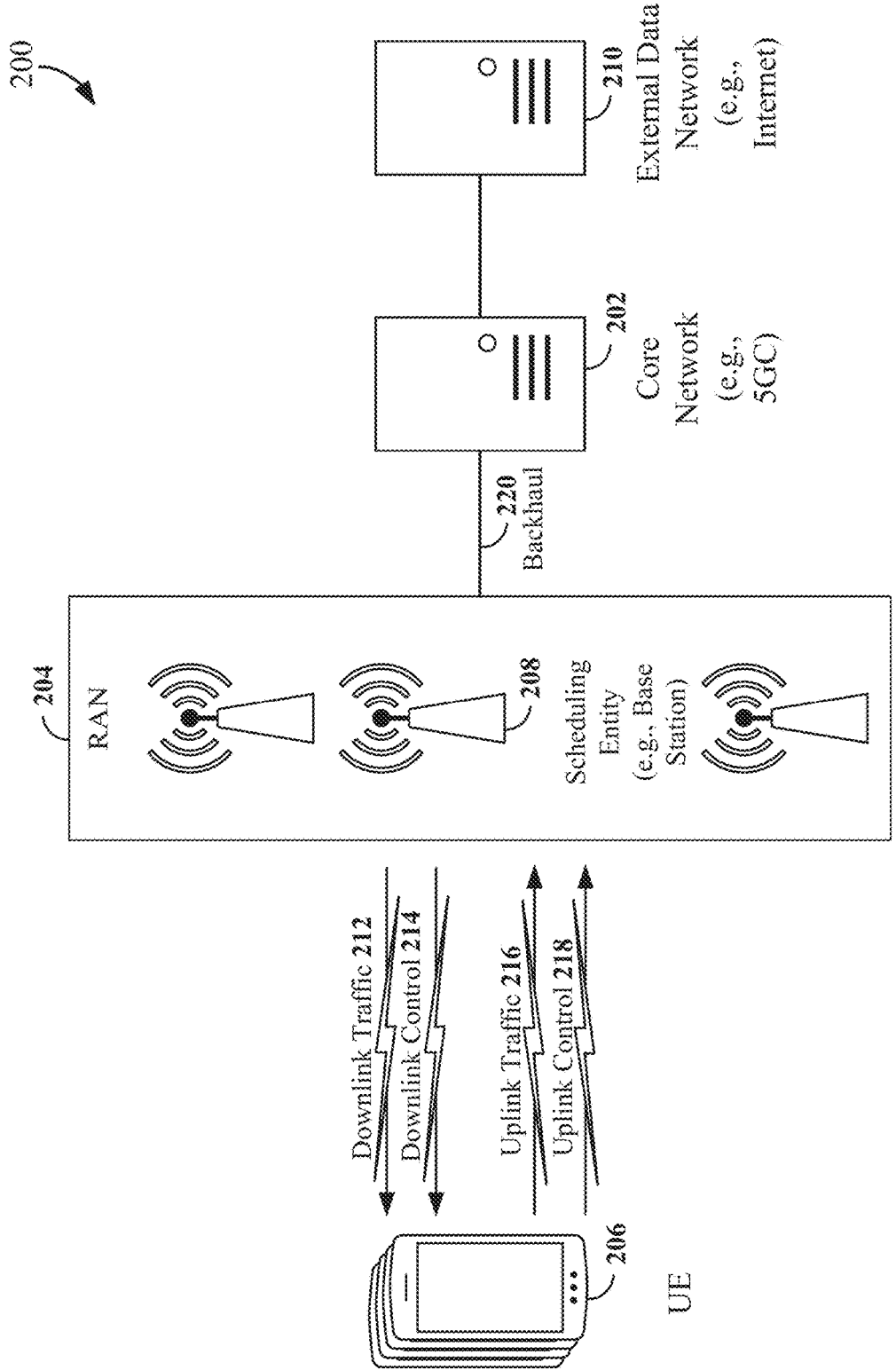
FIG. 2 is a schematic illustration of a wireless communication system according to some aspects.

FIG. 2, as another illustrative example without limitation, illustrates various aspects with reference to a schematic of a wireless communication system 200. The wireless communication system 200 includes three interacting domains: a core network 202, a radio access network (RAN) 204, and a user equipment (UE) 206. By virtue of the wireless communication system 200, the UE 206 may be enabled to carry out data communication with an external data network 210, such as (but not limited to) the Internet.

The RAN 204 may implement any suitable wireless communication technology or technologies to provide radio access to the UE 206. As one example, the RAN 204 may operate according to 3rd Generation Partnership Project (3GPP) New Radio (NR) specifications. As another example, the RAN 204 may operate under a hybrid of 5G NR and Evolved Universal Terrestrial Radio Access Network (eUTRAN) standards, often referred to as LTE, such as in non-standalone (NSA) systems including EN-DC systems. The 3GPP also refers to this hybrid RAN as a next-generation RAN, or NG-RAN. Additionally, many other examples may be utilized within the scope of the present disclosure.

As illustrated in FIG. 2, the RAN 204 includes a plurality of base stations 208. In different technologies, standards, or contexts, the base stations 208 may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The RAN 204 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Wireless communication between the RAN 204 and a UE 206 may be described as utilizing an air interface. Transmissions over the air interface from a base station (e.g., base station 208) to a UE (e.g., UE 206) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 206) to a base station (e.g., base station 208) may be referred to as uplink (UL) transmissions. In accordance with further aspects of the present disclosure, the term uplink may refer to a point-to-point transmission originating at a UE (e.g., UE 206).

In some examples, access to the air interface may be scheduled, wherein a scheduling entity (e.g., a base station 208) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UE 206, which may be a scheduled entity, may utilize resources allocated by the scheduling entity 208.

As illustrated in FIG. 2, a base station or scheduling entity 208 may broadcast downlink traffic 212 to one or more UEs (e.g., UE 206). Broadly, the base station or scheduling entity 208 may be configured as a node or device responsible for scheduling traffic in a wireless communication network, including the downlink traffic 212 and, in some examples, uplink traffic 216 from the UE 206 to the scheduling entity 208. The UE 206 may be configured as a node or device that also receives downlink control information 214, including but not limited to scheduling information (e.g., a grant), synchronization or timing information, or other control information from another entity in the wireless communication network such as the scheduling entity 208. Furthermore, the UE 206 may send uplink control information 218 to the base station 208 including but not limited to scheduling information (e.g., grants), synchronization or timing information, or other control information.

In general, base stations 208 may include a backhaul interface for communication with a backhaul portion 222 of the wireless communication system. The backhaul 222 may provide a link between a base station 208 and the core network 202. Further, in some examples, a backhaul interface may provide interconnection between the respective base stations 208. Various types of backhaul interfaces may be employed, such as a direct physical connection, a virtual network, or the like using any suitable transport network.

The core network 202 may be a part of the wireless communication system 200, and may be independent of the radio access technology used in the RAN 204. In some examples, the core network 202 may be configured according to 5G standards (e.g., 5GC). In other examples, the core network 202 may be configured according to a 4G evolved packet core (EPC), or any other suitable standard or configuration.

In some examples, access to the air interface may be scheduled, wherein a scheduling entity (e.g., a base station 208) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UE 206, which may be a scheduled entity, may utilize resources allocated by the base station or scheduling entity 208.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
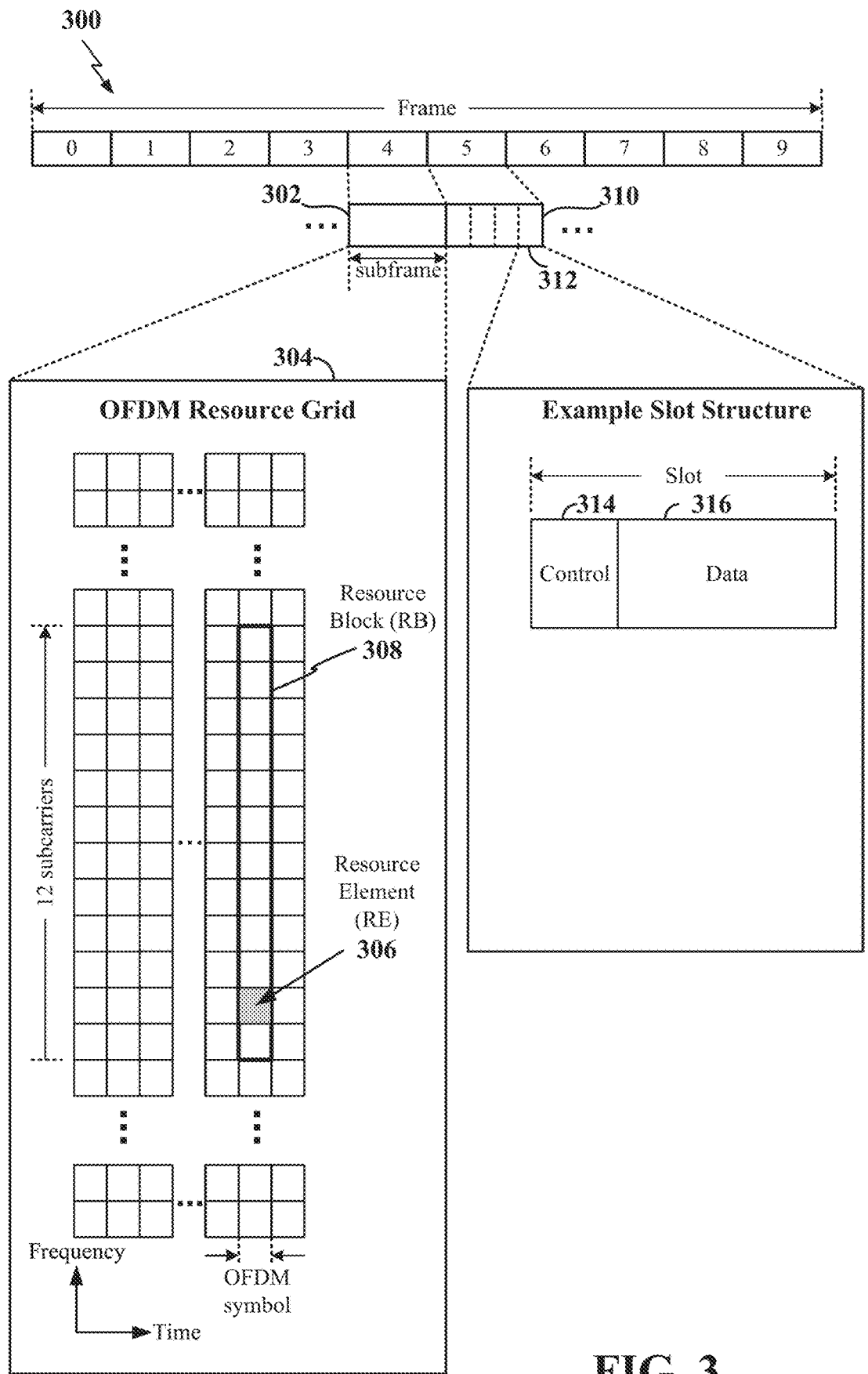
FIG. 3 is a diagram illustrating an example of a frame structure for use in a radio access network according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to a discrete Fourier transform-spread-OFDM (DFT-s-OFDM) with a CP (also referred to as single-carrier FDMA (SC-FDMA)) waveform in substantially the same way as described herein below. That is, while some examples of the present disclosure may focus on an OFDM link for clarity, it should be understood that the same principles may be applied as well to SC-FDMA waveforms.

Within the present disclosure, a frame 300 refers to a duration of 10 ms for wireless transmissions, with each frame consisting of 10 subframes of 1 ms each. A transmission burst may include multiple frames. On a given carrier, there may be one set of frames in the UL, and another set of frames in the DL. Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs (scheduled entities) for downlink or uplink transmissions typically involves scheduling one or more resource elements 306 within one or more sub-bands or bandwidth parts (BWPs). Thus, a UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the illustrative example shown in FIG. 3, one subframe 310 includes four slots. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened TTIs may in some cases be transmitted occupying resources scheduled for ongoing slot transmissions for the same or for different UEs. Any number of resource blocks may be utilized within a subframe or slot.

An expanded view of one of the slots 312 of subframe 310 illustrates the slot 312 as including a control region 314 and a data region 316. In a first example of the slot 312, the control region 314 may carry control channels (e.g., a physical downlink control channel (PDCCH)) and the data region 316 may carry data channels (e.g., a physical downlink shared channel (PDSCH)). In a second example of the slot 312, the control region 314 may carry control channels (e.g., a physical uplink control channel (PUCCH)) and the data region 316 may carry data channels (e.g., a physical uplink shared channel (PUSCH)). Of course, a slot may contain all DL, all UL, or at least one DL portion and at least one UL portion. The structures illustrated in FIG. 3 are merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), channel state information reference signal (CSI-RS), and/or a sounding reference signal (SRS). These pilots or reference signals may provide for a receiving device to perform channel estimation of the corresponding channel, which may enable coherent demodulation/detection of the control and/or data channels within the RB 308.

In some examples, the slot 312 may be utilized for broadcast or unicast communication. For example, a broadcast, multicast, or groupcast communication may refer to a point-to-multipoint transmission by one device (e.g., a base station, UE, or other similar device) to other devices. As used herein, a broadcast communication is delivered to all devices, whereas a multicast communication is delivered to multiple intended recipient devices. A unicast communication may refer to a point-to-point transmission by a one device to a single other device.

In a DL transmission, a transmitting device (e.g., the scheduling entity/base station 108) may allocate one or more REs 306 (e.g., DL REs within the control region 314) to carry DL control information (DCI) including one or more DL control 114 channels that may carry information, for example, originating from higher layers, such as a physical broadcast channel (PBCH), a physical hybrid automatic repeat request (HARQ) indicator channel (PHICH), a physical downlink control channel (PDCCH), etc., to one or more scheduled entities (e.g., UE/scheduled entity 106). A Physical Control Format Indicator Channel (PCFICH) may provide information to assist a receiving device in receiving and decoding the PDCCH and/or Physical HARQ Indicator Channel (PHICH). The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc. The PDCCH may carry downlink control 114, including downlink control information (DCI) for one or more UEs in a cell. This may include, but not limited to, power control commands, scheduling information, a grant, and/or an assignment of REs for DL and UL transmissions.

The base station may further allocate one or more REs 306 to carry other DL signals, such as a demodulation reference signal (DMRS); a phase-tracking reference signal (PT-RS); a positioning reference signal (PRS), a channel-state information reference signal (CSI-RS); a primary synchronization signal (PSS); and a secondary synchronization signal (SSS). These DL signals, which may also be referred to as downlink physical signals, may correspond to sets of resource elements used by the physical layer but they generally do not carry information originating from higher layers. A UE may utilize the PSS and SSS to achieve radio frame, subframe, slot, and symbol synchronization in the time domain, identify the center of the channel (system) bandwidth in the frequency domain, and identify the physical cell identifier or ID (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB 1. Examples of additional system information transmitted in the SIB1 may include, but are not limited to, a random access search space, downlink configuration information, and uplink configuration information. The MIB and SIB1 together provide the minimum system information (SI) for initial access.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

In an UL transmission, a transmitting device (e.g., a UE/scheduled entity 106) may utilize one or more REs 306, including one or more UL control 118 channels that may carry uplink control information (UCI) to the scheduling entity/base station 108, for example UCI may include a variety of packet types and categories, including pilots, reference signals, and information configured to enable or assist in decoding uplink data transmissions. In some examples, the uplink control information may include a scheduling request (SR), i.e., request for the scheduling entity to schedule uplink transmissions. Here, in response to the SR transmitted on the uplink control 118 channel from the scheduled entity 106, the scheduling entity/base station 108 may transmit downlink control information (DCI) that may schedule resources for uplink packet transmissions. UCI may also include HARQ feedback, such as an acknowledgment (ACK) or negative acknowledgment (NACK), channel state information (CSI), channel state feedback (CSF), or any other suitable UL control information (UCI). The UCI may originate from higher layers via one or more UL control channels, such as a physical uplink control channel (PUCCH), a physical random access channel (PRACH), etc. Further, UL REs 306 may carry UL physical signals that generally do not carry information originating from higher layers, such as demodulation reference signals (DMRS), phase-tracking reference signals (PT-RS), sounding reference signals (SRS), etc.

In addition to control information, one or more REs 306 (e.g., within the data region 314) may be allocated for user data traffic. Such traffic may be carried on one or more traffic channels, such as, for a DL transmission, a physical downlink shared channel (PDSCH), or for an UL transmission, a physical uplink shared channel (PUSCH). In some examples, one or more REs 306 within the data region 314 may be configured to carry SIBs (e.g., SIB1), carrying information that may enable access to a given cell.

The physical channels described above are generally multiplexed and mapped to transport channels for handling at the medium access control (MAC) layer. Transport channels carry blocks of information called transport blocks (TB). The transport block size (TB S), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

In some examples, an open-radio access network (O-RAN) architecture may be based on 3GPP technology (e.g., 5G and/or LTE) as discussed above where the O-RAN employs virtualized network elements, white-box hardware, and standardized interfaces that support network intelligence and open interfaces. For example, an O-RAN may be self-driving and able to leverage new learning-based technologies to automate operational network functions. In addition, an O-RAN may employ open interfaces that enable vendors and operators to introduce their own services or customize the network to suit their own unique needs.

To this end, an O-RAN may employ a flexible and distributed baseband architecture where the functionality of a baseband unit (e.g., incorporating modem functionality) may be split among one or more control units and one or more distributed units (which may also be referred to as data units). For example, a baseband unit may include multiple control units, each of which supports multiple distributed units. Each distributed unit may, in turn, support one or more radio units. A control unit, a distributed unit, and a radio unit provide different communication protocol layer functionality and other related functionality.

Figure 4:
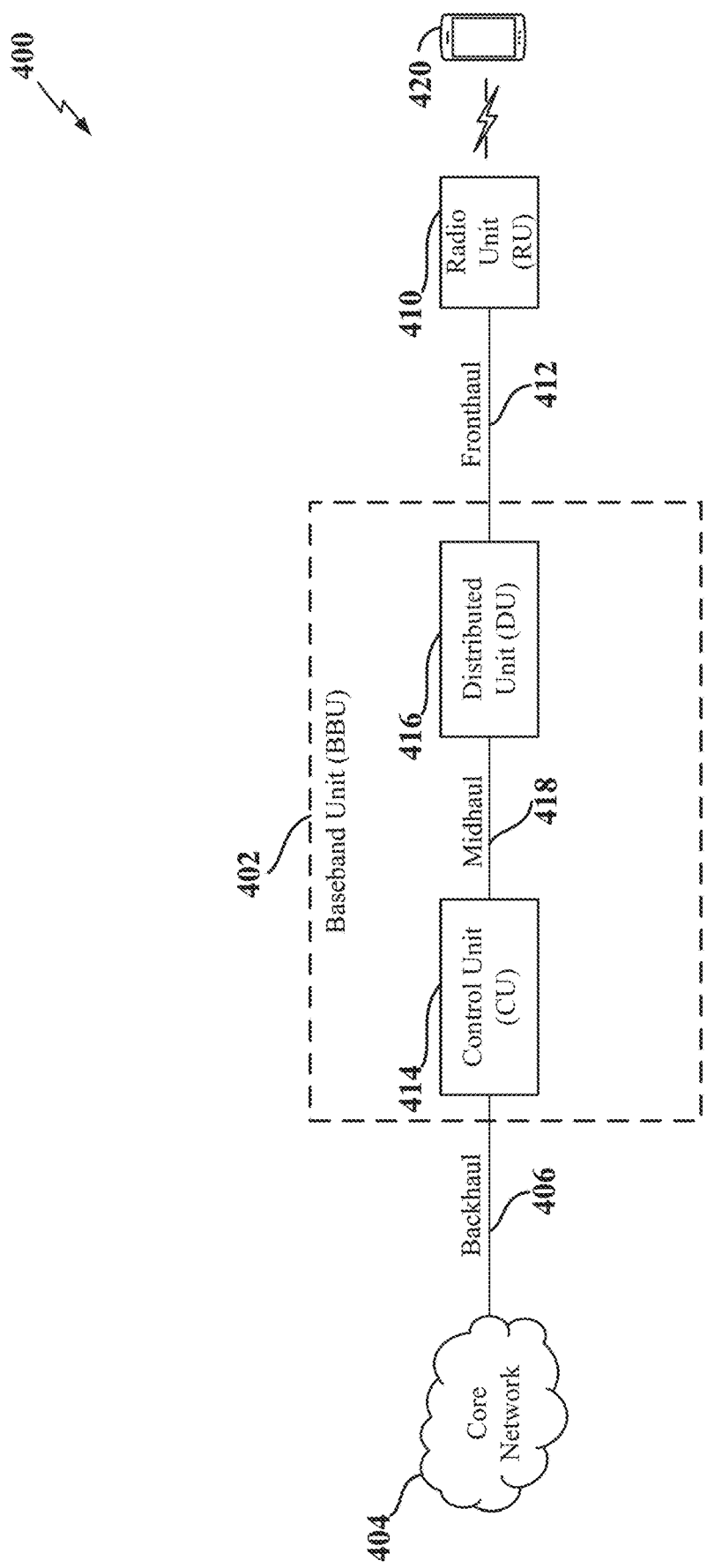
FIG. 4 is a block diagram illustrating an example of an open-radio access network (O-RAN) according to some aspects.

FIG. 4 is a block diagram illustrating an example of several components of an O-RAN 400 according to some aspects. In practice, it is noted that the O-RAN 400 may include other components beyond those illustrated in FIG. 4. A baseband unit (BBU) 402 communicates with a core network 404 via a backhaul link 406 and communicates with at least one radio unit 410 via a fronthaul link 412. The baseband unit 402 includes at least one control unit (CU) 414 and at least one distributed unit (DU) 416 that may communicate via at least one midhaul link 418. Each radio unit 410 communicates with at least one UE 420 via RF signaling.

In some examples, a control unit such as CU 414 is a logical node that hosts a packet data convergence protocol (PDCP) layer, a radio resource control (RRC) layer, a service data adaptation protocol (SDAP) layer and other control functions. A control unit may also terminate interfaces (e.g., E1, E2, etc., not shown in FIG. 4) to network nodes (e.g., nodes of a core network). An F1 interface (not shown in FIG. 4) may provide a mechanism to interconnect a control unit (e.g., the PDCP layer and higher layers) and a distributed unit (e.g., the RLC layer and lower layers). In some aspects, an F1 interface may provide control plane and user plane functions (e.g., interface management, system information management, UE context management, RRC message transfer, etc.). FLAP is an application protocol for F1 that defines signaling procedures for F1 in some examples. The F1 interfaces support F1-C on the control plane and F1-U on the user plane.

In some examples, a distributed unit such as DU 416 is a logical node that hosts a radio link control (RLC) layer, a medium access control (MAC) layer, and a high physical (PHY) layer based on a lower layer functional split (LLS). In some aspects, a distributed unit may control the operation of at least one radio unit. A distributed unit may also terminate interfaces (e.g., F1 interfaces, E2 interfaces, etc.) to the control unit and/or other network nodes. In some examples, a high PHY includes portions of the PHY processing such as forward error correction 1 (FEC 1) encoding and decoding, scrambling, modulation, and demodulation.

In some examples, a radio unit such as RU 410 is a logical node that hosts low PHY layer and radiofrequency (RF) processing based on a lower layer functional split. In some examples, a radio unit may be similar to a 3GPP transmission and receive point (TRP) or remote radio head (RRH), while also including the low PHY layer. In some examples, a low PHY includes portions of the PHY processing such as fast Fourier transform (FFT), inverse FFT (IFFT), digital beamforming, and physical random access channel (PRACH) extraction and filtering. The radio unit may also include a radio chain for communicating with one or more UEs.

Figure 5:
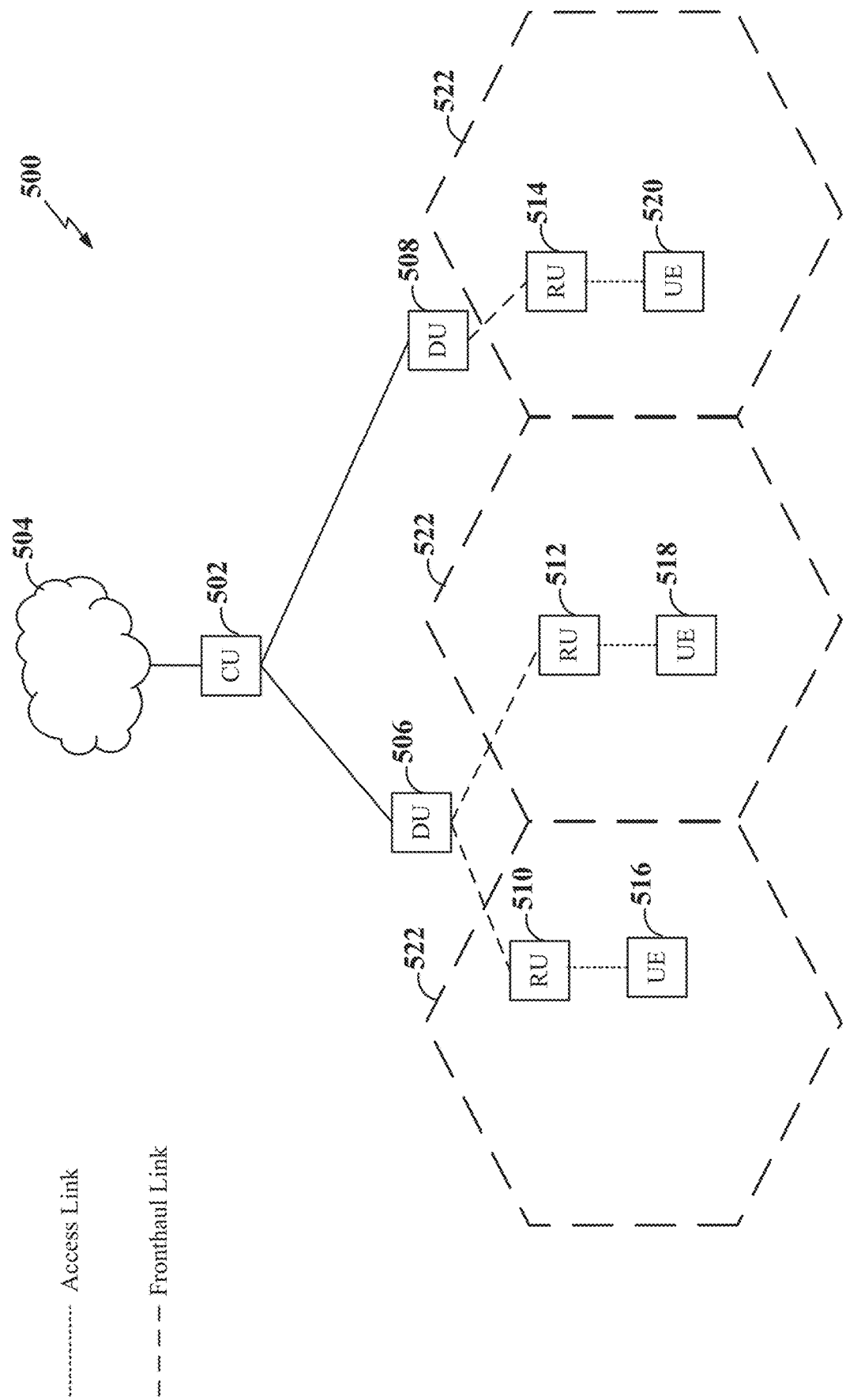
FIG. 5 is a diagram illustrating another example of an O-RAN according to some aspects.

FIG. 5 is a diagram illustrating an example of the distributed nature of an O-RAN 500 according to some aspects. The O-RAN 500 may be similar to the radio access network 200 shown in FIG. 2, in that the O-RAN 500 may be divided into a number of cells (e.g., cells 522) each of which may be served by a respective network nodes (e.g., control units, distributed units, and radio units). The network nodes may constitute access points, base stations (BSs), eNBs, gNBs, or other nodes that utilizes wireless spectrum (e.g., the radio frequency (RF) spectrum) and/or other communication links to support access for one or more UEs located within the cells.

In the example of FIG. 5, a control unit (CU) 502 communicates with a core network 504 via a backhaul link and communicates with a first distributed unit (DU) 506 and a second distributed unit 508 via respective midhaul links. The first distributed unit 506 communicates with a first radio unit (RU) 510 and a second radio unit 512 via respective fronthaul links. The second distributed unit 508 communicates with a third radio unit 514 via a fronthaul link. The first radio unit 510 communicates with at least one UE 516 via at least one RF access link. The second radio unit 512 communicates with at least one UE 518 via at least one RF access link. The third radio unit 514 communicates with at least one UE 520 via at least one RF access link.

Figure 6:
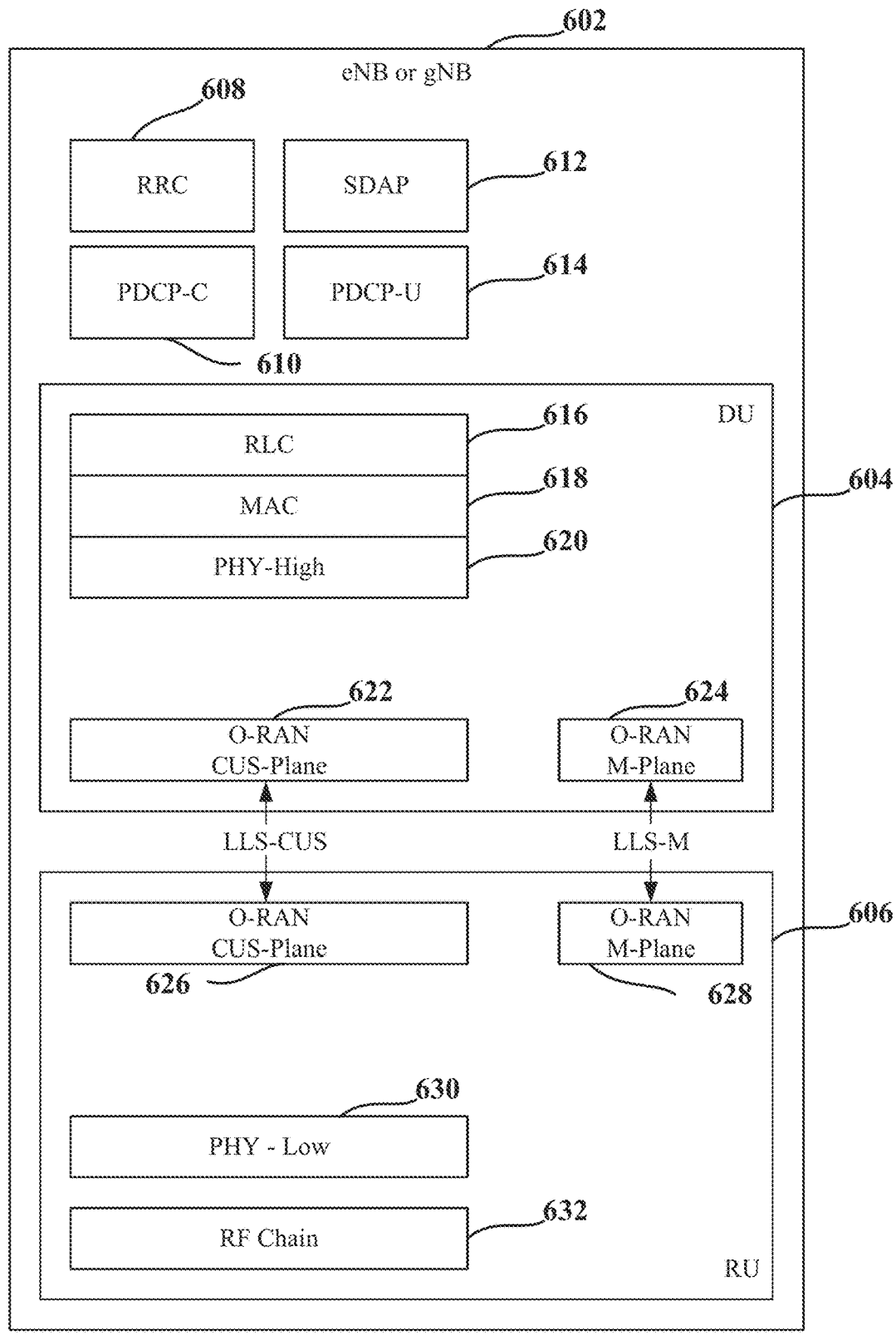
FIG. 6 is a diagram illustrating an example of fronthaul communication according to some aspects.

FIG. 6 is a diagram illustrating an example of an eNB or gNB 602 that includes a distributed unit (DU) 604 and a radio unit (RU) 606 (which may or may not be co-located). The distributed unit 604 and the radio unit 606 exchange control plane information and user plane information via a Lower Layer Split (LLS)-Control, User and Synchronization (CUS) interface over a fronthaul link. The LLS-CUS may include an LLS-C interface and an LLS-U interface that respectively provide a control plane (C-plane) and a user plane (U-plane). In some examples, a control plane refers to real-time control between a distributed unit (DU) and a radio unit (RU). In some aspects, this may be in contrast with a management plane (M-Plane) that may provide non-real-time management operations. The distributed unit 604 and the radio unit 606 exchange management information via an LLS-M interface over the fronthaul link.

The eNB or gNB 602 may include an RRC protocol layer 608 and a PDCP-C protocol layer 610 for control plane signaling as well as an SDAP protocol layer 612 and a PDCP-C protocol layer 614 for user place signaling. In some examples, this functionality may be implemented in one or more control units (not shown in FIG. 6).

The distributed unit 604 includes an RLC protocol layer 616, a MAC protocol layer 618, and higher layer functionality of the physical layer (PHY-High 620). A CUS-plane protocol layer 622 communicates control plane information and user plane information via the LLS-CUS interface. An M-plane protocol layer 624 communicates management plane information via the LLS-M interface.

The radio unit 606 includes a CUS-plane protocol layer 626 that communicates control plane information and user plane information via the LLS-CUS interface as well as an M-plane protocol layer 628 that communicates management plane information via the LLS-M interface. The radio unit 606 includes lower layer functionality of the physical layer (PHY-Low 630) and at least one RF chain 632.

As discussed above, a network may schedule resources for UL and/or DL communication between the network and the UE. For example, the network may schedule a time slot for a UE where the time slot includes a number of symbols (e.g., 14 symbols) and a number of resource elements (e.g., 12 REs). As was discussed before, in some examples a time slot may be subdivided into sections, where different sections may carry different types of information (e.g., PDSCH and DMRS). These different types of information may be modulated using different modulation schemes. In an O-RAN, scheduling information indicating the above may be sent from the network to the UE via the control plane between a distributed unit and a radio unit.

In O-RAN systems, C-Plane messages are encapsulated using a two-layered header approach. The first layer consists of an enhanced Common Public Radio Interface (eCPRI) common header or an IEEE 1914.3 common header, including corresponding fields used to indicate the message type. The second layer is an application layer including necessary fields for control and synchronization. Within the application layer, a "section" defines the characteristics of U-plane data to be transferred or received from a beam with one pattern identifier (ID). In general, the transmission header, application header, and sections are all intended to be aligned on 4-byte boundaries and are transmitted in a "network byte order," which means that the most significant byte of a multi-byte parameter is transmitted first.

Figure 7:
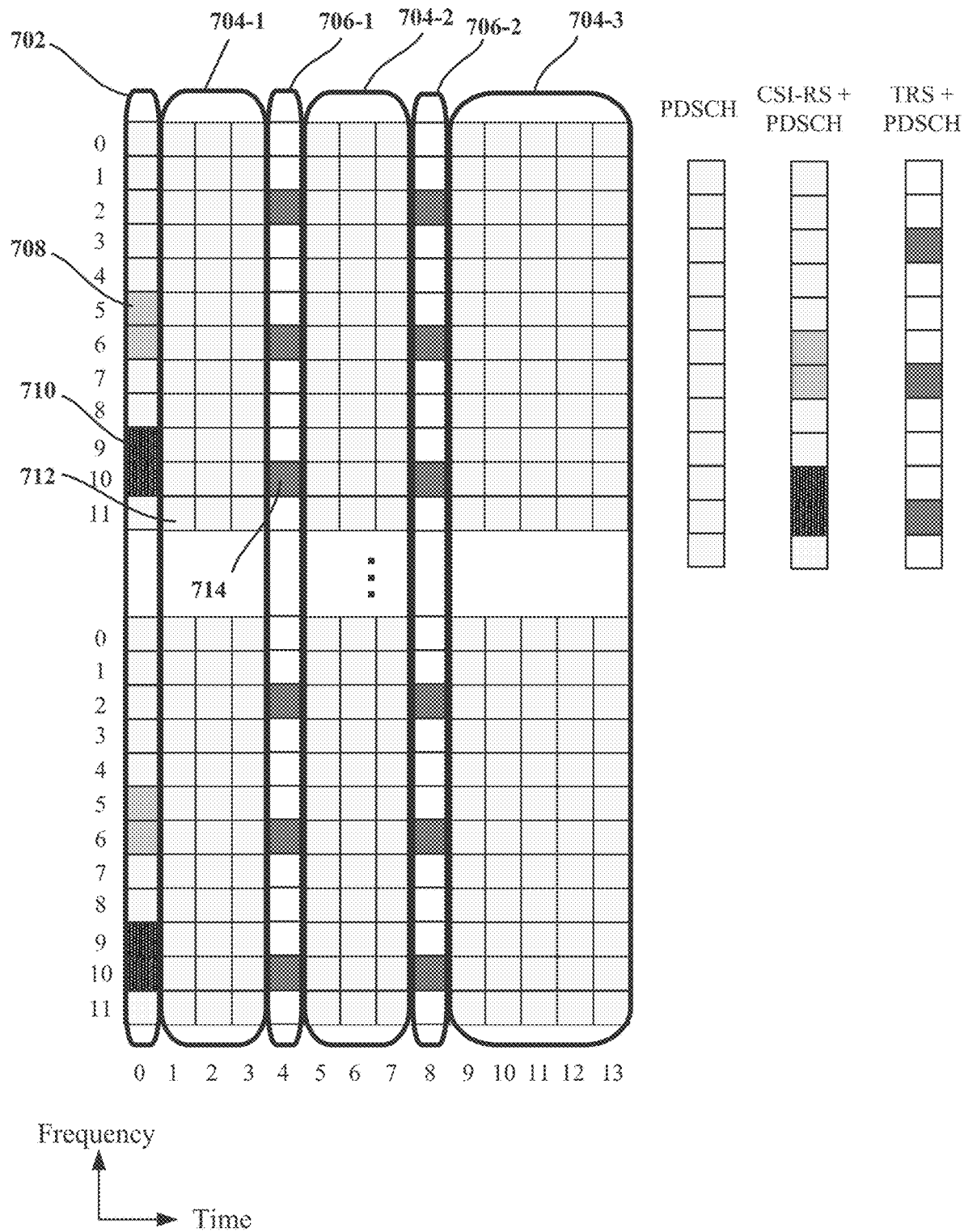
FIG. 7 is a diagram illustrating an example of control plane sections in a time/frequency resource grid according to some aspects.

FIG. 7 illustrates an example of control plane sections configured according O-RAN specifications. As shown, a number of resource elements having time and frequency (i.e., symbols 0-13 in the time dimension and a number of resource blocks in frequency) for a PDSCH. The purpose of the various sections (e.g., 702, 704, 706) is to collect a set of tones and associate them with a particular property, such as beamforming weights, for example. In this example, the various sections are non-overlapping and a section is created for a group of symbols/RBs that have a same pattern (e.g., 704-1, 704-2, and 704-3 have a same pattern, and 706-1 and 706-2 share another pattern).

Moreover, each section may be further divided into "section invocations" with different RE masks (Resource Element Masks also known as Tone masks). In this example, one set of weights may be applied to each section invocation and each section may have a unique section ID. For example, symbol 0 may have a section ID, but have three invocations where: (1) Invocation 1 is a CSI RS Port 1 (shown in shading such as at 708, for example) and an RE Mask: 0000 0011 0000; (2) Invocation 2 is a CSI RS Port 2 (shown in shading such as at 710, for example) with RE Mask: 0011 0000 0000; and (3) Invocation 3, which is the PDSCH (shown in light shading such as at 712 for example) with an RE Mask: 1100 1100 1111.

In another example, symbols 1, 2, 3, 5, 6, 7, 10, 11, 12, 13 have a section ID, but only have a single invocation for the section (i.e., section 704), which may be an Invocation 4 that is the PDSCH (shown in light shading), and having an RE Mask: 1111 1111 1111. Still further, the third section 706 at symbols 4 and 8 may also have a section ID with two invocations: (1) Invocation 5 that includes a tracking reference signal (TRS), which is shown in dark shading such as at 714, for example, and having an RE Mask: 0100 0100 0100; and (2) and Invocation 6 that is PDSCH (light shading) and has an RE Mask: 1011 1011 1011. Thus, it is noted that in the example of FIG. 7, there are a total of six invocations.

Of further note, the O-RAN specifications (e.g., O-RAN WG4.CUS.0-v04.00 or O-RAN WG4.CUS.0-v06.00)) includes methodologies to couple the User Plane and Control Plane. One method includes coupling the User Plane and Control Plane via frequency and time (See e.g., O-RAN WG4.CUS.0, section 5.4.1.2.2). Another method includes coupling the User Plane and Control Plane via frequency and time with priorities (e.g., O-RAN WG4.CUS.0, section 5.4.1.2.3). In the case of coupling via frequency and time with priorities, this mechanism allows more than one data section to describe a single Resource Element (RE) within a single C-plane message. Data section descriptions that refer to the same RE within the same C-Plane message may have different priorities in order to avoid ambiguity.

Figure 8:
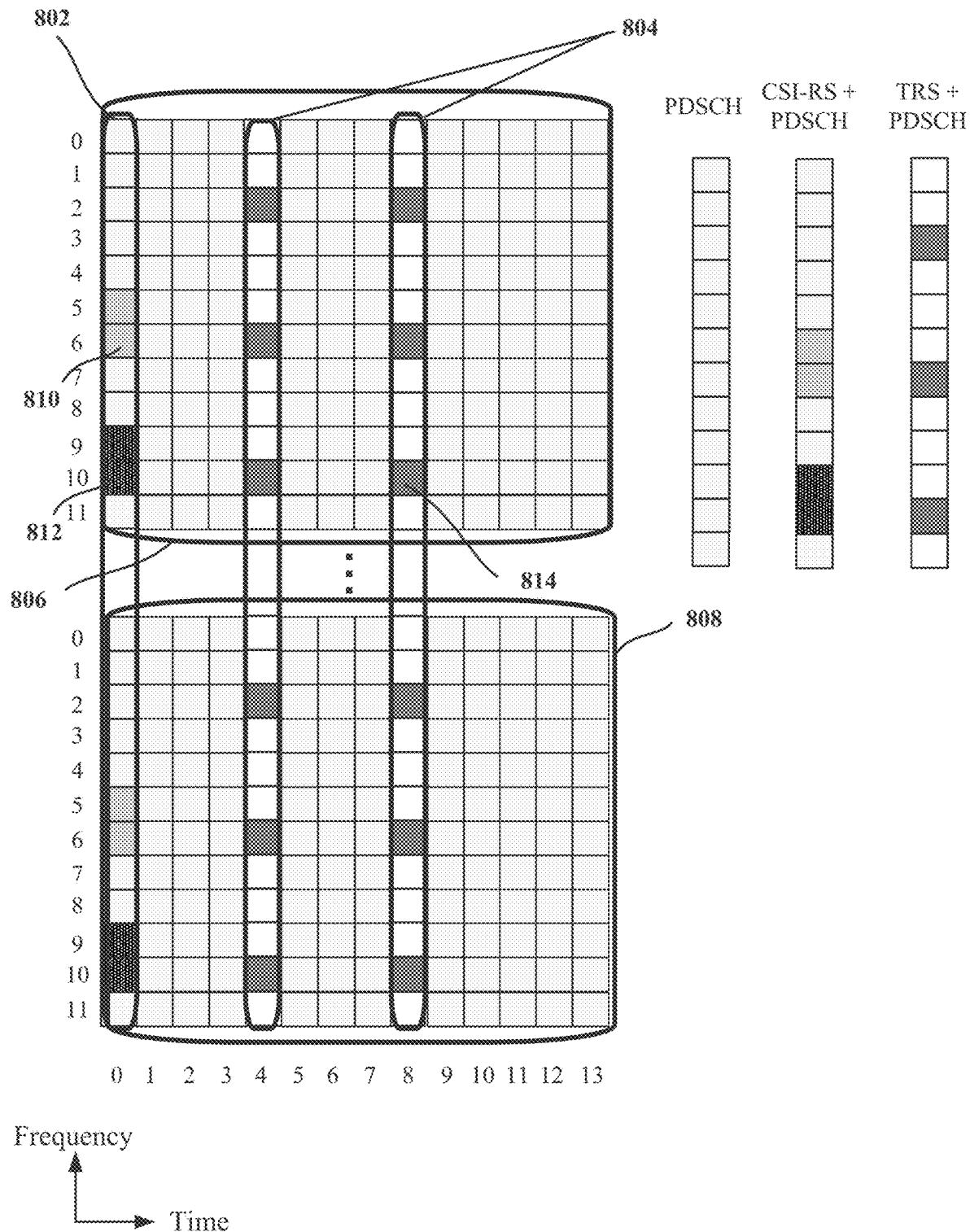
FIG. 8 is a diagram illustrating another example of control plane sections with high priority in a time/frequency resource grid according to some aspects.

FIG. 8 illustrates an example of sections in a time/frequency grid that includes priorities as specified in the O-RAN specifications. In this example, the use of the mechanism of coupling with priority may allow sections to overlap, as may be seen with higher priority sections 802 and 804 overlapping a base low priority section 806 or 808. Additionally, the sections do not require a unique ID, such as in the example of FIG. 7. The base sections or layers 806 or 808 have low priority that can be overlapped by high priority sections or layers (e.g., 802 or 804) that may puncture the low priority tones of the base section or layer. Additionally, it is noted for high priority section 802 that occurs during symbol 0, this single section has 2 invocations: Invocation 2, which is CSI RS Port 1 (shown at shading 810, for example) and having an RE Mask[M] of 0000 0110 0000; and Invocation 3, that is a CSI RS Port 2 (shown at shading 812, for example) and having an RE Mask of 0110 0000 0000. Furthermore, high priority section 804 at symbols 4 and 8 have one invocation that may be denoted as Invocation 4 consisting of TRS (shown at dark shading 814, for example) and having an RE Mask of 0100 0100 0100. Yet further, the low priority sections 806 or 808 are base sections that include all symbols and all RBs. These sections include an Invocation 1, that is the PDSCH and has an RE Mask 1111 1111 1111. It is noted that in this example, only 4 section invocations provide a savings of invocations needed (e.g., 4 invocations represents a 1.5 times savings compared to the 6 invocations in the example of FIG. 7). In more complex examples, the savings may be even more significant with greater than three times the savings. It is noted that the generation of such sections are easier for a DU to create, but they are much more complex for an RU to process.

According to the O-RAN specification, if an optimized set of section descriptions does not fit into one C-Plane message, the section may be divided into several messages. An example of this bifurcation is illustrated in FIG. 9 showing two messages 902 and 904. It is further noted that if set of section descriptions does not fit into one C-Plane message, then a sender (e.g., DU) will duplicate highest priority data section descriptions. This may be seen at 906 in FIG. 9 where the high priority value (+1) is shown for particular high priority section descriptions (e.g. reference signaling), which are repeated or duplicated. In one particular example, the C-Plane messages may concern a beamforming configuration where the complete configuration may not be transmitted in a single message from a DU to an RU. Each C-Plane message will contain the highest priority section description referring to any RE that is referred in a message. This ensures that an RU will interpret the configuration received in each message correctly.

Figure 10:
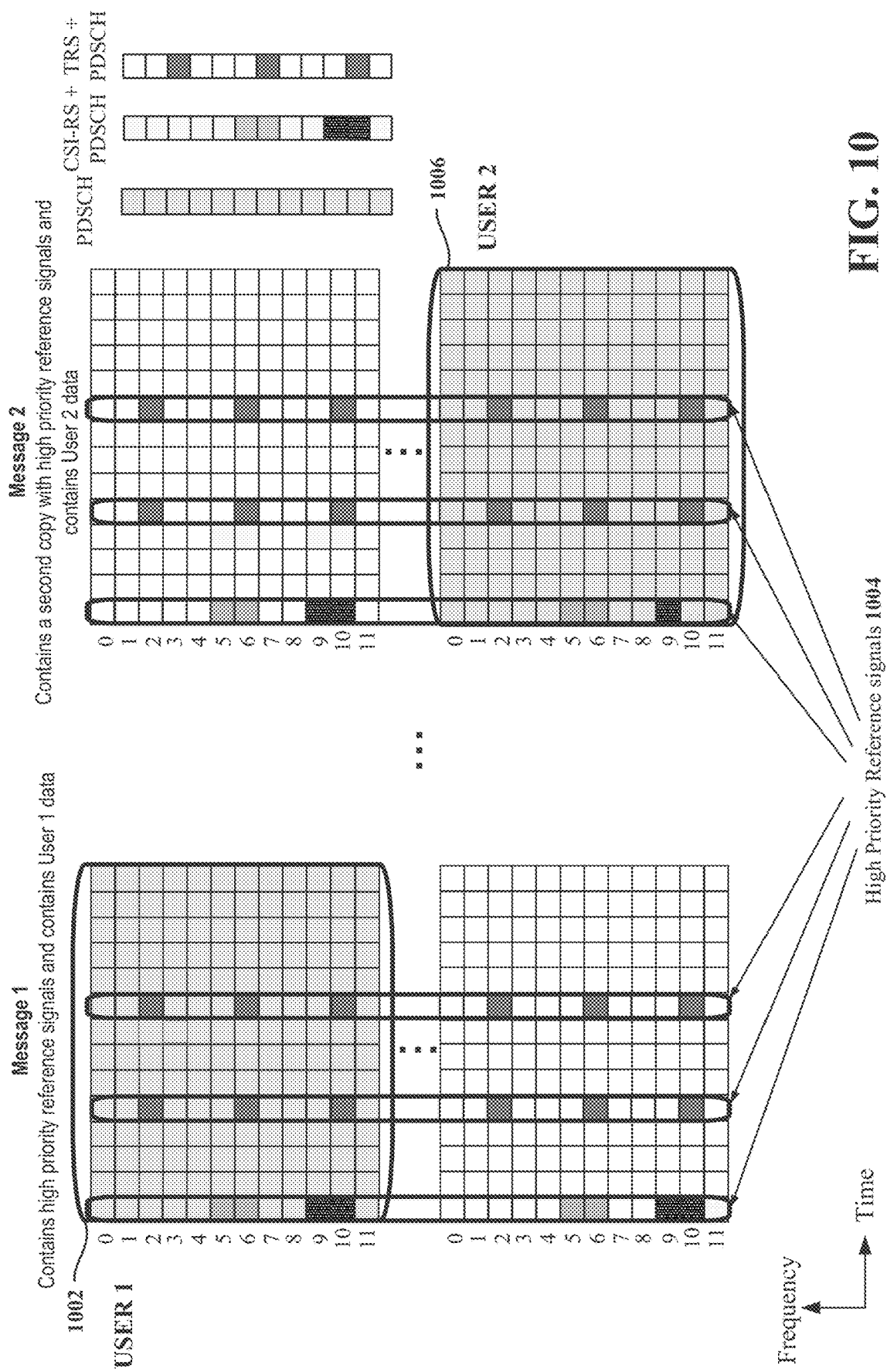
FIG. 10 is a diagram illustrating another example of control plane sections with high priority and multiple users in a time/frequency resource grid according to some aspects.

As a further illustration, FIG. 10 shows a message one 1002 on the left for a first user (User 1) that contains high priority reference signals (1004). Additionally, a message two 1006 on the right is transmitted that has a second copy with the high priority reference signals 1004 and contains a second user (User 2) in different resource blocks. This example illustrates that splitting and repetition of a high priority section may be performed. Additionally, the same high priority descriptors (or messages) for the reference signals may be repeated in two or more messages.

It is noted that from the examples of FIGS. 9 and 10 above, the highest priority section description may be repeated across multiple messages so that each message is interpreted correctly. However, this can create problem for the receiving RU. In particular, typically each message will be processed independently in the RU, possibly by different processors, without any coordination between them. In the case of sections concerning beamforming configurations, for example, this may cause the RU to apply beamforming weights multiple times for the REs in the highest priority sections. In order to avoid this issue, an RU may be configured to keep track of weights that have been processed for every RE. This requires the RU to maintain the state on a per RE basis across all layers and symbols. Such state management is expensive in terms of memory. As an example, for maintaining the states for 64 layers, 275 RBs, 12 REs, and 14 symbols requires 275*64*12*14 states, which would require approximately 3 Mbits of memory. The maintenance of such states would necessitate a high speed dedicated memory as part of a beamforming hardware block in an RU, for example. This amount of memory would be a significant addition to the hardware size of the RU and, thus, the cost of the RU. Further such stateful operation may require synchronization between independent processing entities in the RU causing unacceptable latencies.

In view of the above, the presently disclosure relates in some aspects to mitigating the need for maintaining memory states by providing an indication when high priority sections (e.g., the highest priority sections having a greatest priority value) are being repeated. In some aspects, this indication may be conveyed in a control message, such as an extension to a section header that is included in a data section. In a particular example, the indication that high priority sections are being repeated may be accomplished by placing a value or indication in a particular section extension such as section extension 6 (i.e., extType 6) as defined by the O-RAN specifications. It is noted that while the present examples to be discussed below illustrate conveyance of the repeated high priority sections, it is possible that different sections, section extension types, and/or particular fields or IDs may be used as well.

Figure 11:
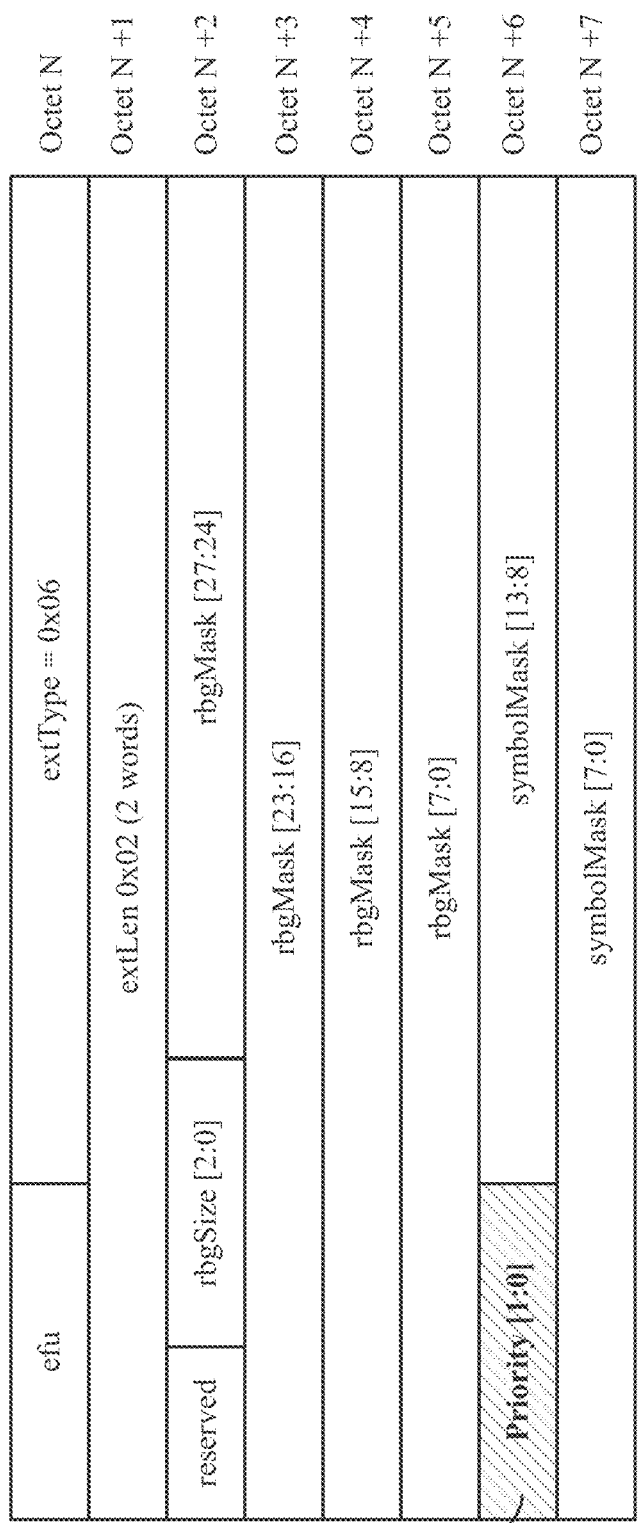
FIG. 11 is a diagram illustrating an example of an information element according to some aspects.
Figure 12:
FIG. 12 is a diagram illustrating another example of an information element according to some aspects.

In some examples, as shown in FIG. 11, an Extension Type 6 information element 1100 may be used, but the disclosure is not limited to such. In this particular example, a DU (e.g., DU 416 in FIG. 4, DUs 506 or 508 in FIG. 5 or DU 604 in FIG. 6) may be configured to use a priority field 1102 in the N+6 octet of the extension 1100, which may be a two bit field in some examples. In particular, the priority value in this field 1102 may be predetermined to be a value that is not previously utilized such as a value of −2 in one example Thus, when an RU (e.g., RU 410 in FIG. 4, RUs 510, 512, or 514 in FIG. 5 or DU 606 in FIG. 6) receives and parses this extension 1100 (and the priority field 1102 in particular), the RU is informed that FIG. 12 illustrates another example of an Extension Type 6 information element 1200 that may be used, wherein a field is utilized to indicate to an RU that high priority section will be repeated. In this particular example, a DU may be configured to use a reserved field 1202 in the N+2 octet of the extension 1200. In particular, the priority value in this field 1202 may be a single bit value where the setting of this bit (e.g., set to state "1") is used indicate to a receiving RU that the high priority sections (e.g., the highest value priority sections) will be repeated.

According to yet further aspects, the DU may provide the indication of repeat of high priority sections by using other types of control messages. That is, in one example, the control message may include a "Section ID," which is termed "sectionId" in the RAN WG4.CUS.0 specification, which is then used to identify any repeated high priority sections. In an aspect, this Section ID is another field in either another extension or another section that is used to provide an identification of a section. On the receiving side (i.e., at the RU), it is noted that the RU may be configured to keep track of which Section IDs have been processed already. Based on this tracking of the Section IDs processed, an RU can determine when a high priority section is or will be repeated.

In further aspects, it is noted that when there is no repetition indication or message, there may be corner cases that force the DU to send beam weights (e.g., "beam-Weights") on all repetitions to an RU, which significantly wastes fronthaul bandwidth. Accordingly in further aspects, it is noted that when using the control message to indicate repeat of a high priority section, whether through using a field (or repetition flag or bits in a field) in a section extension or the Section ID, the DU may be further configured to include transmission of beam weights (e.g., beam-Weights) along with a beam identifier (e.g., beamId) on a first repetition of the highest-priority section sent to an RU over the fronthaul. For subsequent repetitions, however, the DU may be configured to only send the beam identifier (beamId). This configuration allows the DU to not repeatedly send the beam weights, which results in fronthaul bandwidth savings.

Figure 13:
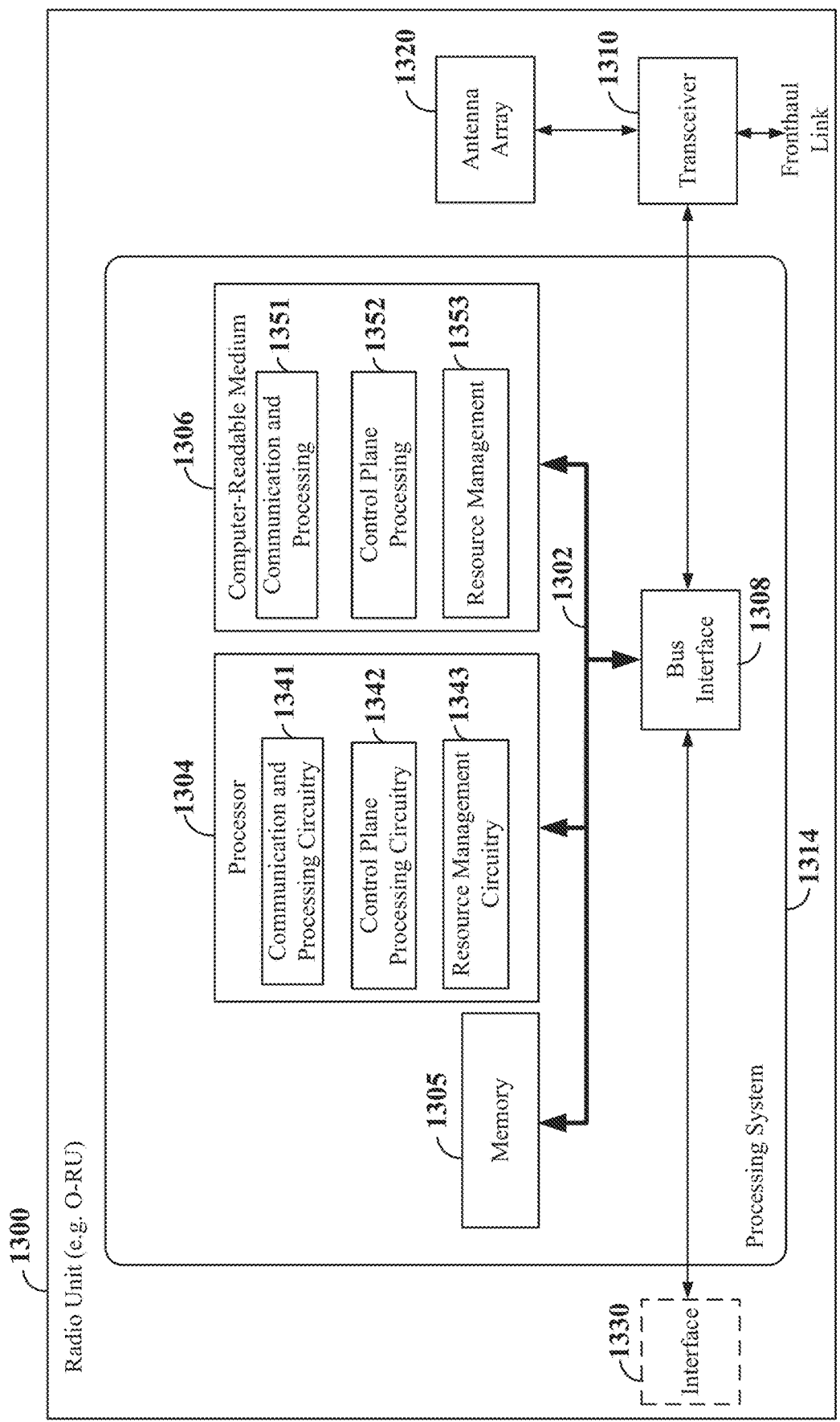
FIG. 13 is a block diagram illustrating an example of a hardware implementation for a radio unit employing a processing system according to some aspects.

FIG. 13 is a block diagram illustrating an example of a hardware implementation for a radio unit (e.g., an O-RU configured for an O-RAN system) 1300 employing a processing system 1314. For example, the radio unit 1300 may be configured to wirelessly communicate with a UE, as discussed in any one or more of FIG. 1, 2, 4, or 5. In some examples, the radio unit 1300 may be equivalently referred to as a radio device, a network node, a scheduling entity, a base station, or referenced in some other manner. In some implementations, the radio unit (RU) 1300 may correspond to at least a portion of any of the BSs (e.g., eNBs and/or gNBs) or scheduling entities shown in FIGS. 1, 2, 4, 5, and/or 6.

In accordance with various aspects of the disclosure, an element, or any portion of an element, or any combination of elements may be implemented with the processing system 1314. The processing system 1314 may include one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the radio unit 1300 may be configured to perform any one or more of the functions described herein. That is, the processor 1304, as utilized in a radio unit 1300, may be used to implement any one or more of the processes and procedures described herein.

The processor 1304 may in some instances be implemented via a baseband or modem chip and in other implementations, the processor 1304 may itself comprise a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 and between the bus 1302 and an interface 1330. The transceiver 1310 provides a communication interface or means for communicating with various other apparatus over a wireless transmission medium. In some examples, the radio unit may include two or more transceivers 1310, each configured to communicate with a respective network type (e.g., terrestrial or non-terrestrial). The interface 1330 provides a communication interface or means of communicating with various other apparatuses and devices (e.g., other devices housed within the same apparatus as the radio unit or other external apparatuses) over an internal bus or external transmission medium, such as an Ethernet cable. Depending upon the nature of the apparatus, the interface 1330 may include a user interface. Of course, such a user interface is optional, and may be omitted in some examples.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The radio unit 1300 may be configured to perform any one or more of the operations described herein (e.g., as described above in conjunction with FIGS. 1-11 and as described below in conjunction with FIG. 14). In some aspects of the disclosure, the processor 1304, as utilized in the radio unit 1300, may include circuitry configured for various functions.

The processor 1304 may include communication and processing circuitry 1341. The communication and processing circuitry 1341 may be configured to communicate with a UE via transceiver 1310 (or RF elements thereof) and antenna array 1320. In other aspects, the communication and processing circuitry 1341 may be used for communication with a DU via the transceiver 1310 (or network communication elements thereof) and a fronthaul link.

In some implementations where the communication involves receiving information, the communication and processing circuitry 1341 may obtain information from a component of the radio unit 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for receiving.

In some implementations where the communication involves sending (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for sending (e.g., means for transmitting).

The processor 1304 may include control plane processing circuitry 1342 configured to perform control plane processing-related operations as discussed herein (e.g., receiving a control plane message and obtaining the indication of the repeat of high priority messages from a control plane message from a DU via the fronthaul link). The control plane processing circuitry 1342 may include functionality for a means for obtaining an indication of the repeat of high priority messages from a control message (e.g., extension type 6 message). The control plane processing circuitry 1342 may further be configured to execute control plane processing software 1352 included on the computer-readable medium 1306 to implement one or more functions described herein.

The processor 1304 may include resource management circuitry 1343 configured to perform resource management-related operations as discussed herein (e.g., communicating via a time slot). The resource management circuitry 1343 may include functionality for a means for communicating information during a time slot. The resource management circuitry 1343 may further be configured to execute resource management software 1353 included on the computer-readable medium 1306 to implement one or more functions described herein.

Figure 14:
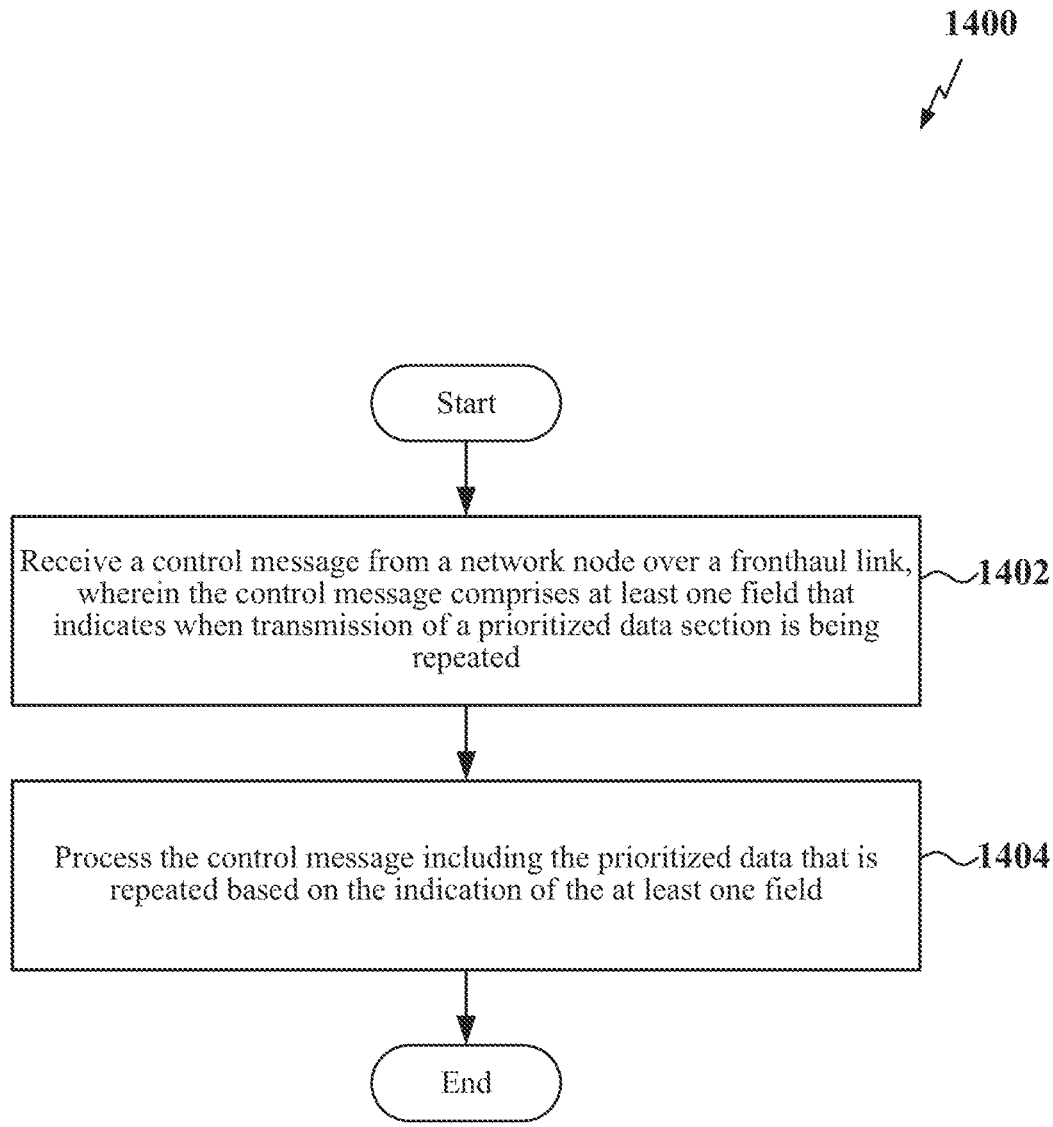
FIG. 14 is a flow chart of an example process for receiving a control message with repeat sections according to some aspects.

FIG. 14 is a flow chart illustrating an example method 1400 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the method 1400 may be carried out by the radio unit (RU) 1300 illustrated in FIG. 13. In some examples, the method

1400 may be carried out by any suitable apparatus or means for carrying out the functions or algorithm described below.

At block 1402, a radio unit such as radio unit 1300, includes receiving a control message from a network node over a fronthaul link, wherein the control message comprises at least one field that indicates when transmission of a prioritized data section is being repeated. In an aspect, the transceiver 1310 and/or communication and processing circuitry 1341, or equivalents thereof may provide means for receiving a control message from a network node over a fronthaul link Further, method 1400 includes processing the control message including the prioritized data that is repeated based on the indication of the at least one field as shown in block 1404. In an aspect, the control plane processing circuitry 1342, or equivalents thereof may provide means for receiving a control message from a network node over a fronthaul link According to further aspects, the control message is a control plane (C-Plane) message configured for transmission on the fronthaul link. Additionally, the C-Plane message comprises a data section extension that includes the at least one field that indicates when the transmission of the prioritized data section is being repeated.

In further aspects, the data section extension comprises an open-radio access network (O-RAN) extension type 6 information element. According to further aspects, the at least one field is configured to indicate a predetermined bit value that signals the transmission of the prioritized data section is being repeated. As merely one example, the predetermined bit value may be negative two. In still further example, the at least one field is one of a predetermined priority field of bits in the extension type-6 information element or at least one bit in a reserved bit field in the extension type-6 information element.

In still other examples, the prioritized data section that is being repeated comprises a duplicate of at least one highest priority data section description. In yet another example, the prioritized data section that is being repeated correlates to a beamforming configuration that is transmitted in two or more control messages. Further, the network node in communication with RU may be a distributed unit (DU), such as illustrated in FIG. 4, 5, 6, or 15 (to be discussed below).

According to yet further aspects, method 1400 may include receiving the indication of the repeat of highest priority sections based on a Section ID transmitted by a DU. Furthermore, method 1400 may include that the RU keeps track of or determines which Section IDs have already been processed and, based on this tracking, then determines when a highest priority section will be repeated. In an aspect, one or more of the transceiver 1310, the communication and processing circuitry 1341, the control plane processing circuitry 1342, or resource management circuitry 1343 may provide means for receiving and processing the Section ID, tracking the Section IDs processed, and determining when a highest priority section will be repeated based on the tracking of the Sections IDs processed.

In further aspects, method 1400 may include receiving a transmission of beam weights (e.g., beamWeights) from a DU along with a beam identifier (e.g., beamId) on a first repetition or transmission of the highest priority section. For subsequent repetitions of the highest priority section, however, the RU receives only the beam identifier (beamId) from the DU. In an aspect, one or more of the transceiver 1310, the communication and processing circuitry 1341, the control plane processing circuitry 1342, or resource management circuitry 1343 may provide means for receiving and processing the beamId and beamWeights on a first transmission, and receiving and processing only the beamId on subsequent transmissions when determining when a highest priority section will be repeated.

Figure 15:
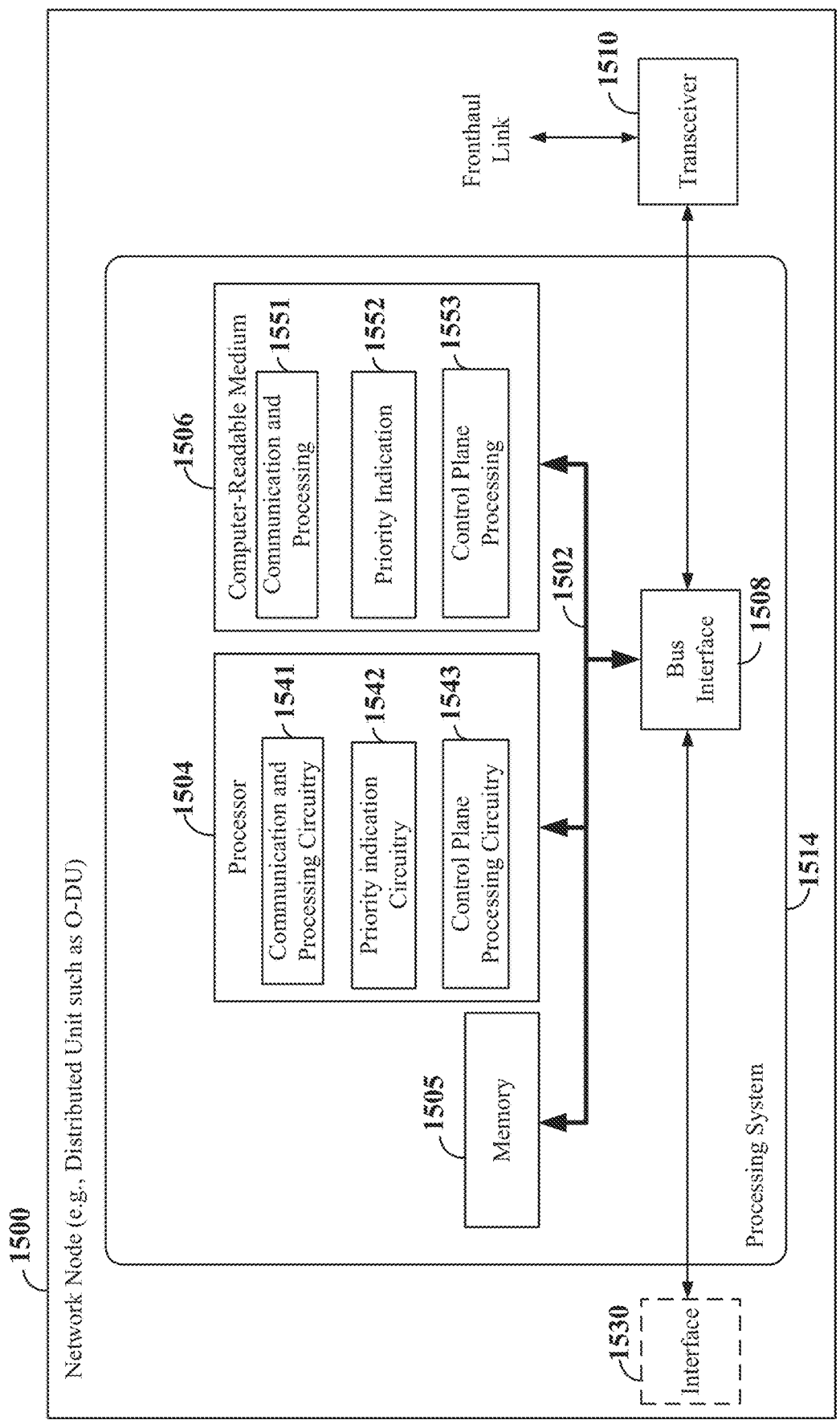
FIG. 15 is a block diagram illustrating an example of a hardware implementation for a network node (e.g., a distributed unit) employing a processing system according to some aspects.

FIG. 15 is a conceptual diagram illustrating an example of a hardware implementation for network node 1500, such as a distributed unit (e.g., an O-DU operable according to the O-RAN standard) employing a processing system 1514. In some examples, the network node may be equivalently referred to as a network device, a distributed unit, a scheduling entity, a base station, or referenced in some other manner. In some implementations, the network node 1500 may correspond to any of the B Ss (e.g., eNBs and/or gNBs) or scheduling entities shown in FIGS. 1, 2, 4, 5, and/or 6.

In accordance with various aspects of the disclosure, an element, or any portion of an element, or any combination of elements may be implemented with the processing system 1514. The processing system may include one or more processors 1504. The processing system 1514 may be substantially the same as the processing system 1214 illustrated in FIG. 12, including a bus interface 1508, a bus 1502, memory 1505, a processor 1504, and a computer-readable medium 1506. Furthermore, the network node 1500 may include an interface 1530 (e.g., a network interface) that provides a means for communicating with at least one other apparatus within a core network and with at least one radio access network.

The network node 1500 may be configured to perform any one or more of the operations described herein (e.g., as described above in conjunction with FIGS. 1-12 and as described below in conjunction with FIG. 16). In some aspects of the disclosure, the processor 1504, as utilized in the network node 1500, may include circuitry configured for various functions.

The processor 1504 may be configured to generate, schedule, and modify a resource assignment or grant of time-frequency resources (e.g., a set of one or more resource elements). For example, the processor 1504 may schedule time-frequency resources within a plurality of time division duplex (TDD) and/or frequency division duplex (FDD) subframes, slots, and/or mini-slots to carry user data traffic and/or control information to and/or from multiple UEs. The processor 1504 may be configured to schedule resources for the transmission of a downlink signal. The processor 1504 may further be configured to schedule resources for the transmission of an uplink signal.

In some aspects of the disclosure, the processor 1504 may include communication and processing circuitry 1541. The communication and processing circuitry 1541 may include one or more hardware components that provide the physical structure that performs various processes related to communication (e.g., signal reception and/or signal transmission) as described herein. The communication and processing circuitry 1541 may further include one or more hardware components that provide the physical structure that performs various processes related to signal processing (e.g., processing a received signal and/or processing a signal for transmission) as described herein. The communication and processing circuitry 1541 may further be configured to execute communication and processing software 1551 included on the computer-readable medium 1506 to implement one or more functions described herein.

In some implementations where the communication involves receiving information, the communication and processing circuitry 1541 may obtain information from a component of the network node 1500 (e.g., from the transceiver 1510 that receives the information via radio frequency signaling or some other type of signaling suitable for the applicable communication medium), process (e.g., decode) the information, and output the processed information. For example, the communication and processing circuitry 1541 may output the information to another component of the processor 1504, to the memory 1505, or to the bus interface 1508. In some examples, the communication and processing circuitry 1541 may receive one or more of signals, messages, other information, or any combination thereof. In some examples, the communication and processing circuitry 1541 may receive information via one or more channels. In some examples, the communication and processing circuitry 1541 may include functionality for a means for receiving.

In some implementations where the communication involves sending (e.g., transmitting) information, the communication and processing circuitry 1541 may obtain information (e.g., from another component of the processor 1504, the memory 1505, or the bus interface 1508), process (e.g., encode) the information, and output the processed information. For example, the communication and processing circuitry 1541 may output the information to the transceiver 1510 (e.g., that transmits the information via a fronthaul link such as to one or more radio units (RUs)). In some examples, the communication and processing circuitry 1541 may send one or more of signals, messages, other information, or any combination thereof. In some examples, the communication and processing circuitry 1541 may send information via one or more channels. In some examples, the communication and processing circuitry 1541 may include functionality for a means for sending (e.g., means for transmitting).

The processor 1504 may include priority indication circuitry 1542 configured to perform indication of the repeat of high priority sections as discussed herein. The priority indication circuitry 1542 may include functionality for a means for generating a control message. The priority indication circuitry 1542 may further be configured to priority indication software 1552 included on the computer-readable medium 1506 to implement one or more functions described herein.

The processor 1504 may further include control plane processing circuitry 1543 configured to perform control plane processing-related operations as discussed herein (e.g., generating a and sending a control plane message including the priority indication to a radio unit). The control plane processing circuitry 1543 may include functionality for a means for generating a control message. The control plane processing circuitry 1543 may further be configured to execute control plane processing software 1553 included on the computer-readable medium 1506 to implement one or more functions described herein. In some examples, the priority indication circuitry 1542 and/or the control plane processing circuitry 1543 may be configured to generate and/or send a control signal or message consisting of repetition flag or bit in a field, such as was discussed above in connection with FIG. 11 or 12. In other examples, the priority indication circuitry 1542 and/or the control plan processing circuitry 1543 may be configured to send or generate a control signal or message consisting of a Section ID in a section, wherein the Section ID is configured to communicate or signal to an RU whether a high priority section will be repeated.

Figure 16:
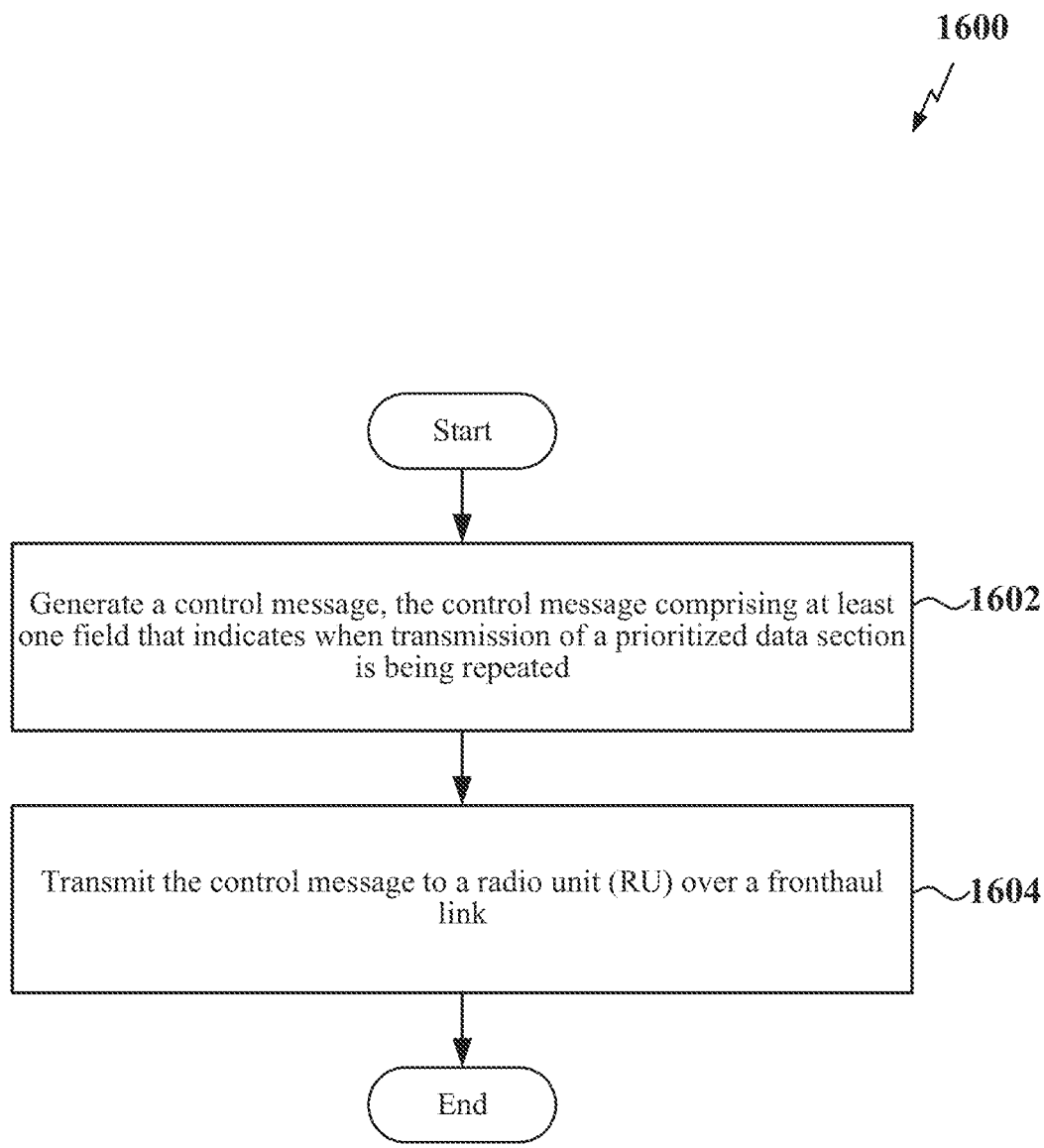
FIG. 16 is a flow chart of an example process for communicating a control message indicating repeat sections according to some aspects.

FIG. 16 is a flow chart illustrating an example method 1600 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the method 1600 may be carried out by the network node 1500 (e.g., a DU or O-DU) illustrated in FIG. 15. In some examples, the method 1600 may be carried out by any suitable apparatus or means for carrying out the functions or algorithm described below.

At block 1602, the network node may generate a control message, the control message comprising at least one field that indicates when transmission of a prioritized data section is being repeated. In an aspect, the priority indication circuitry 1542 and/or control plane processing circuitry 1543 or equivalents thereof may provide means for generating the control message comprising at least one field that indicates when transmission of a prioritized data section is being repeated.

Further, method 1600 includes transmitting the control message to a radio unit (RU) over a fronthaul link as shown at block 1604. In an aspect, the priority indication the control plane processing circuitry 1543, the communication and processing circuitry 1541, and/or the transceiver 1510, or equivalents thereof, may provide means for transmitting the control message to the RU over the fronthaul link.

According to further examples, the control message is a control plane (C-Plane) message configured for transmission on the fronthaul link. In one example, the C-Plane message comprises a data section extension that includes the at least one field that indicates when the transmission of the prioritized data section is being repeated. Further, in another example the data section extension comprises an open-radio access network (O-RAN) extension type 6 information element. Still further, in one example the at least one field is configured to indicate a predetermined bit value that signals the transmission of the prioritized data section is being repeated. According to some aspects, the predetermined bit value is negative two. Additionally, the at least one field is one of a predetermined priority field of bits in the extension type-6 information element or at least one bit in a reserved bit field in the extension type-6 information element.

In some other examples, the prioritized data section that is being repeated comprises a duplicate of at least one highest priority data section description. Additionally, in other examples the prioritized data section that is being repeated correlates to a beamforming configuration that is transmitted in two or more control messages.

According to yet further aspects, method 1600 may include providing the indication of repeat of high priority sections by using other types of control messages. In an aspect, method 1600 may include using a Section ID in either another extension or another section that is used to provide an identification of repetition of a highest priority section. In an aspect, the priority indication circuitry 1542 and/or control plane processing circuitry 1543 or equivalents thereof may provide means for generating and/providing the control message using a Section ID to indicate when transmission of a prioritized or highest priority data section is being repeated.

In further aspects, method 1600 may further include provision of beam weights (e.g., beamWeights) along with a beam identifier (e.g., beamId) on a first repetition of the highest priority section to the RU and then for subsequent repetitions, only sending the beam identifier (beamId) to the RU. In an aspect, one or more of the transceiver 1510, the communication and processing circuitry 1541, the priority indication circuitry 1542, or control plane processing circuitry 1543 may provide means for transmitting the beamId and beamWeights on a first transmission, and receiving and transmitting only the beamId on subsequent transmissions when a highest priority section is to be repeated.

Several aspects of a wireless communication network have been presented with reference to an exemplary implementation. As those skilled in the art will readily appreciate, various aspects described throughout this disclosure may be extended to other telecommunication systems, network architectures and communication standards.

The following provides an overview of aspects of the present disclosure:

Aspect 1: A method of communication at a network node, the method comprising: generating a control message, the control message comprising at least one field that indicates when transmission of a prioritized data section is being repeated; and transmitting the control message to a radio unit (RU) over a fronthaul link.

Aspect 2: The method of aspect 1, wherein the control message is a control plane (C-Plane) message configured for transmission on the fronthaul link.

Aspect 3: The method of aspect 2, wherein the C-Plane message comprises a data section extension that includes the at least one field that indicates when the transmission of the prioritized data section is being repeated.

Aspect 4: The method of any of aspects 1 through 3, wherein the data section extension comprises an open-radio access network (O-RAN) extension type 6 information element.

Aspect 5: The method of any of aspects 1 through 4, wherein the at least one field is configured to indicate a predetermined bit value that signals the transmission of the prioritized data section is being repeated.

Aspect 6: The method of aspect 5, wherein the predetermined bit value is negative two.

Aspect 7: The method of either aspect 5 or aspect 6, wherein the at least one field is one of a predetermined priority field of bits in the extension type-6 information element or at least one bit in a reserved bit field in the extension type-6 information element.

Aspect 8: The method of any of aspects 1 through 7, wherein the prioritized data section that is being repeated comprises a duplicate of at least one highest priority data section description.

Aspect 9: The method of any of aspects 1 through 7, wherein the prioritized data section that is being repeated correlates to a beamforming configuration that is transmitted in two or more control messages.

Aspect 10: The method of any of aspects 1 through 9, wherein the control message comprising at least one field comprises a section identifier.

Aspect 11: The method of any of aspects 1 through 10, further comprising: transmitting beam weights and a beam identifier with a first transmission of the prioritized data section over the fronthaul link; and transmitting the beam identifier without the beam weights for subsequent repeat transmissions of the prioritized data section over the fronthaul link after the first transmission.

Aspect 12: The method of any of aspects 1 through 11, wherein the network node comprises a distributed unit (DU).

Aspect 13: The method of any of aspects 1 through 12, wherein the prioritized data section comprises a highest priority data section.

Aspect 14: A network node comprising: a transceiver; a memory; and a processor communicatively coupled to the transceiver and the memory, wherein the processor and the memory are configured to: generate a control message, the control message comprising at least one field that indicates when transmission of a prioritized data section is being repeated; and transmit the control message to a radio unit (RU) over a fronthaul link with the transceiver.

Aspect 15: The network node of aspect 14, wherein the control message is a control plane (C-Plane) message configured for transmission on the fronthaul link.

Aspect 16: The network node of aspect 15, wherein the C-Plane message comprises a data section extension that includes the at least one field that indicates when the transmission of the prioritized data section is being repeated.

Aspect 17: The network node of aspect 16, wherein the data section extension comprises an open-radio access network (O-RAN) extension type 6 information element.

Aspect 18: The network node of any of aspects 14 through 17, wherein the control message comprising at least one field comprises a section identifier configured to indicate repetition of the prioritized data section.

Aspect 19: The network node of any of aspects 14 through 18, wherein the processor and the memory are further configured to: transmit beam weights and a beam identifier with a first transmission of the prioritized section over the fronthaul link; and transmit the beam identifier without the beam weights for subsequent repeat transmissions of the prioritized section over the fronthaul link after the first transmission.

Aspect 20: The network node of any of aspects 14 through 19, wherein the network node comprises a distributed unit (DU).

Aspect 21: The network node of any of aspects 14 through 20, wherein the prioritized data section comprises a highest priority data section.

Aspect 22: A method of communication at a radio unit (RU), the method comprising: receiving a control message from a network node over a fronthaul link, wherein the control message comprises at least one field that indicates when transmission of a prioritized data section is being repeated; and processing the control message including the prioritized data section that is repeated based on the indication of the at least one field.

Aspect 23: The method of aspect 22, wherein the control message is a control plane (C-Plane) message configured for transmission on the fronthaul link.

Aspect 24: The method of aspect 23, wherein the C-Plane message comprises a data section extension that includes the at least one field that indicates when the transmission of the prioritized data section is being repeated.

Aspect 25: The method of aspect 24, wherein the data section extension comprises an open-radio access network (O-RAN) extension type 6 information element.

Aspect 26: The method of any of aspects 22 through 25, wherein the network node comprises a distributed unit (DU).

Aspect 27: The method of any of aspects 22 through 26, wherein the control message comprising at least one field comprises a section identifier configured to indicate repeat of the prioritized data section.

Aspect 28: The method of any of aspects 22 through 27, further comprising: receiving beam weights and a beam identifier with a first transmission of the prioritized data section over the fronthaul link; and receiving the beam identifier without the beam weights for subsequent repeat transmissions of the prioritized data section over the fronthaul link after the first transmission.

Aspect 29: The method of any of aspects 22 through 28, wherein the prioritized data section comprises a highest priority data section.

Aspect 30: A radio unit (RU) comprising: a transceiver; a memory; and a processor communicatively coupled to the transceiver and the memory, wherein the processor and the memory are configured to: receive a control message from a network node over a fronthaul link, wherein the control message comprises at least one field that indicates when transmission of a prioritized data section is being repeated; and process the control message including the prioritized data that is repeated based on the indication of the at least one field.

Aspect 31: An apparatus configured for wireless communication comprising at least one means for performing a method of any one of aspects 1 through 13 or aspects 22 through 29.

Aspect 32: A non-transitory computer-readable medium storing computer-executable code, comprising code for causing an apparatus to perform a method of any one of aspects 1 through 13 or aspects 22 through 29.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any one or more of FIG. 1, 2, 4-6, 13, or 15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of communication at a network node, the method comprising:
   transmitting a first message in a first slot subdivided into one or more sections, each section comprising one or more symbols, each symbol comprising one or more resource blocks, each section having a unique pattern of resource elements, wherein at least one section has a higher priority than another section of the one or more sections;
   transmitting a control message comprising a data section extension comprising an open-radio access network (O-RAN) extension type 6 information element indicating the at least one section having the higher priority is to be repeated; and
   transmitting a second message in a second slot including a repetition of the at least one section having the higher priority.

2. The method of claim 1, wherein the control message is a control plane (C-Plane) message configured for transmission on a fronthaul link.

3. The method of claim 1, wherein the information element is configured to indicate a predetermined bit value that signals the transmitting of the at least one section having the higher priority is to be repeated.

4. The method of claim 3, wherein the predetermined bit value is negative two.

5. The method of claim 1, wherein the information element is one of a predetermined priority field of bits in the extension type 6 information element or at least one bit in a reserved bit field in the extension type 6 information element.

6. The method of claim 1, wherein the at least one section having the higher priority includes at least one of: a channel state information-reference signal (CSI-RS), or a tracking reference signal (TRS).

7. The method of claim 1, wherein the at least one section having the higher priority correlates to a beamforming configuration that is transmitted in two or more control messages.

8. The method of claim 1, wherein the control message comprises a section identifier.

9. The method of claim 1, further comprising:
transmitting beam weights and a beam identifier with the first message; and
transmitting the beam identifier without the beam weights with the second message.

10. The method of claim 1, wherein the network node comprises a distributed unit (DU).

11. The method of claim 1, wherein the higher priority of the at least one section having the higher priority is a highest priority among the one or more sections.

12. A network node comprising:
a transceiver;
a memory; and
a processor communicatively coupled to the transceiver and the memory, wherein the processor and the memory are configured to:
transmit a first message in a first slot subdivided into one or more sections, each section comprising one or more symbols, each symbol comprising one or more resource blocks, each section having a unique pattern of resource elements, wherein at least one section has a higher priority than another section of the one or more sections;
transmit a control message comprising a data section extension comprising an open-radio access network (O-RAN) extension type 6 information element indicating the at least one section having the higher priority is to be repeated; and
transmit a second message in a second slot including a repetition of the at least one section having the higher priority.

13. The network node of claim 12, wherein the control message is a control plane (C-Plane) message configured for transmission on a fronthaul link.

14. The network node of claim 12, wherein the control message comprises a section identifier configured to indicate repetition of a prioritized data section.

15. The network node of claim 12, wherein the processor and the memory are further configured to:
transmit beam weights and a beam identifier with the first message; and
transmit the beam identifier without the beam weights with the second message.

16. The network node of claim 12, wherein the network node comprises a distributed unit (DU).

17. The network node of claim 12, wherein the higher priority of the at least one section having the higher priority is a highest priority among the one or more sections.

18. A method of communication at a radio unit (RU), the method comprising:
receiving a first message in a first slot subdivided into one or more sections, each section comprising one or more symbols, each symbol comprising one or more resource blocks, each section having a unique pattern of resource elements, wherein at least one section has a higher priority than another section of the one or more sections;
receiving a control message comprising a data section extension comprising an open-radio access network (O-RAN) extension type 6 information element indicating the at least one section having the higher priority is to be repeated; and
receiving a second message in a second slot including a repetition of the at least one section having the higher priority.

19. The method of claim 18, wherein the control message is a control plane (C-Plane) message configured for transmission on a fronthaul link.

20. The method of claim 18, wherein the RU receives the first message, the control message, and the second message from a distributed unit (DU).

21. The method of claim 18, further comprising:
receiving beam weights and a beam identifier with the first message; and
receiving the beam identifier without the beam weights with the second message.

22. The method of claim 18, wherein the higher priority of the at least one section having the higher priority is a highest priority among the one or more sections.

23. A radio unit (RU) comprising:
a transceiver;
a memory; and
a processor communicatively coupled to the transceiver and the memory, wherein the processor and the memory are configured to:
receive a first message in a first slot subdivided into one or more sections, each section comprising one or more symbols, each symbol comprising one or more resource blocks, each section having a unique pattern of resource elements, wherein at least one section has a higher priority than another section of the one or more sections;
receive a control message comprising a data section extension comprising an open-radio access network (O-RAN) extension type 6 information element indicating the at least one section having the higher priority is to be repeated; and
receive a second message in a second slot including a repetition of the at least one section having the higher priority.

\* \* \* \* \*